US010255868B2

(12) United States Patent
Miyake

(10) Patent No.: US 10,255,868 B2
(45) Date of Patent: Apr. 9, 2019

(54) METHOD FOR DRIVING LIQUID CRYSTAL DISPLAY DEVICE

(71) Applicant: Semiconductor Energy Laboratory Co., Ltd., Atsugi-shi, Kanagawa-ken (JP)

(72) Inventor: Hiroyuki Miyake, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 0 days.

(21) Appl. No.: 15/844,750

(22) Filed: Dec. 18, 2017

(65) Prior Publication Data
US 2018/0190219 A1 Jul. 5, 2018

Related U.S. Application Data

(63) Continuation of application No. 12/976,431, filed on Dec. 22, 2010, now Pat. No. 9,852,703.

(30) Foreign Application Priority Data

Dec. 25, 2009 (JP) ................................. 2009-295608

(51) Int. Cl.
*G09G 3/36* (2006.01)
*G02F 1/133* (2006.01)
(Continued)

(52) U.S. Cl.
CPC ......... *G09G 3/3614* (2013.01); *G02F 1/1368* (2013.01); *G02F 1/13306* (2013.01);
(Continued)

(58) Field of Classification Search
CPC ......... G09G 2300/0876; G09G 3/3655; G09G 3/3614; G09G 3/3648; G09G 3/3677
(Continued)

(56) References Cited

U.S. PATENT DOCUMENTS 5,534,884 A 7/1996 Mase et al.
5,686,932 A * 11/1997 Tomita ................. G09G 3/3648
345/92

(Continued)

FOREIGN PATENT DOCUMENTS

EP 1111574 A 6/2001
EP 1280129 A 1/2003
(Continued)

OTHER PUBLICATIONS

Tsuda.K et al., "Ultra Low Power Consumption Technologies for Mobile TFT-LCDs ", IDW '02 : Proceedings of the 9th International Display Workshops, Dec. 4, 2002, pp. 295-298.

(Continued)

*Primary Examiner* — Koosha Sharifi-Tafreshi
(74) *Attorney, Agent, or Firm* — Fish & Richardson P.C.

(57) ABSTRACT

An object is to suppress deterioration of a displayed image even when a refresh rate is reduced in displaying a still image. A liquid crystal display device includes a pixel transistor electrically connected to a pixel electrode, and a capacitor having one electrode electrically connected to the pixel electrode and the other electrode electrically connected to a capacitor line. The pixel transistor is turned on and a voltage based on an image signal is supplied to the pixel electrode, and then, the pixel transistor is turned off so that a holding period during which the pixel electrode holds the voltage based on the image signal starts. A holding signal corresponding to change of the voltage based on the image signal in the pixel electrode in the holding period is supplied to the capacitor line so that a potential of the pixel electrode is constant.

12 Claims, 15 Drawing Sheets

US 10,255,868 B2

Page 2

(51) Int. Cl.
*G02F 1/1362* (2006.01)
*G02F 1/1368* (2006.01)
*G09G 5/18* (2006.01)

(52) U.S. Cl.
CPC ..... *G02F 1/136213* (2013.01); *G09G 3/3655* (2013.01); *G09G 5/18* (2013.01); *G09G 3/3611* (2013.01); *G09G 2300/0404* (2013.01); *G09G 2300/0408* (2013.01); *G09G 2300/0426* (2013.01); *G09G 2300/0876* (2013.01); *G09G 2320/10* (2013.01)

(58) Field of Classification Search
USPC .................................................. 345/87, 92
See application file for complete search history.

(56) References Cited

U.S. PATENT DOCUMENTS

| | | | |
|---|---|---|---|
| 5,731,856 A | 3/1998 | Kim et al. |
| 5,744,864 A | 4/1998 | Cillessen et al. |
| 5,748,169 A | 5/1998 | Okumura et al. |
| 6,005,543 A | 12/1999 | Kimura |
| 6,052,103 A | 4/2000 | Fujiwara et al. |
| 6,166,714 A | 12/2000 | Kishimoto |
| 6,169,532 B1 | 1/2001 | Sumi et al. |
| 6,294,274 B1 | 9/2001 | Kawazoe et al. |
| 6,317,109 B1 | 11/2001 | Lee |
| 6,535,191 B1 | 3/2003 | Miyachi |
| 6,548,960 B2 | 4/2003 | Inukai |
| 6,563,174 B2 | 5/2003 | Kawasaki et al. |
| 6,590,552 B1 | 7/2003 | Yokoyama et al. |
| 6,727,522 B1 | 4/2004 | Kawasaki et al. |
| 6,756,740 B2 | 6/2004 | Inukai |
| 7,002,541 B2 | 2/2006 | Yanagi et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,123,246 B2 | 10/2006 | Nakatani et al. |
| 7,145,540 B2 | 12/2006 | Hector et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,321,353 B2 | 1/2008 | Tsuda et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,696,964 B2 | 4/2010 | Lankhorst et al. |
| 7,732,819 B2 | 6/2010 | Akimoto et al. |
| 7,807,515 B2 | 10/2010 | Kato et al. |
| 7,978,277 B2 | 7/2011 | Kimura |
| 8,106,382 B2 | 1/2012 | Saitoh et al. |
| 8,120,721 B2 | 2/2012 | Kimura |
| 8,130,187 B2 | 3/2012 | Nakao et al. |
| 8,378,391 B2 | 2/2013 | Koyama et al. |
| 8,384,077 B2 | 2/2013 | Yano et al. |
| 8,395,718 B2 | 3/2013 | Kimura |
| 8,456,400 B2 | 6/2013 | Fujita et al. |
| 8,711,314 B2 | 4/2014 | Kimura |
| 8,854,286 B2 | 10/2014 | Yamazaki et al. |
| 9,341,908 B2 | 5/2016 | Kimura |
| 9,368,082 B2 | 6/2016 | Yamazaki et al. |
| 9,852,703 B2 | 12/2017 | Miyake |
| 2001/0024187 A1 | 9/2001 | Sato et al. |
| 2001/0046027 A1 | 11/2001 | Tai et al. |
| 2002/0056838 A1 | 5/2002 | Ogawa |
| 2002/0075205 A1 | 6/2002 | Kimura et al. |
| 2002/0080131 A1 | 6/2002 | Fujino |
| 2002/0093473 A1 | 7/2002 | Tanaka et al. |
| 2002/0132454 A1 | 9/2002 | Ohtsu et al. |
| 2002/0180675 A1 | 12/2002 | Tobita et al. |
| 2003/0156104 A1 | 8/2003 | Morita |
| 2003/0179172 A1* | 9/2003 | Miyachi ............. G09G 3/3648 345/89 |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0078104 A1 | 4/2005 | Matthies et al. |
| 2005/0083289 A1 | 4/2005 | Yang |
| 2005/0110734 A1 | 5/2005 | Hirosawa |
| 2005/0199959 A1 | 9/2005 | Chiang et al. |
| 2005/0199967 A1* | 9/2005 | Hoffman ............. H01L 29/7869 257/411 |
| 2006/0007093 A1 | 1/2006 | La |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0119755 A1 | 6/2006 | Senda et al. |
| 2006/0163583 A1 | 7/2006 | Jiroku |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0152921 A1 | 7/2007 | Osame |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0273682 A1 | 11/2007 | Yi et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0042963 A1 | 2/2008 | Fujita |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0170028 A1 | 7/2008 | Yoshida |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0273021 A1 | 11/2008 | Yang |
| 2008/0284931 A1 | 11/2008 | Kimura |
| 2008/0296568 A1 | 12/2008 | Ryu et al. |

(56) References Cited

U.S. PATENT DOCUMENTS

| | | |
|---|---|---|
| 2009/0001380 A1 | 1/2009 | Yang et al. |
| 2009/0015533 A1 | 1/2009 | Fujita et al. |
| 2009/0045397 A1 | 2/2009 | Iwasaki |
| 2009/0068773 A1 | 3/2009 | Lai et al. |
| 2009/0072226 A1 | 3/2009 | Koo et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0237391 A1 | 9/2009 | Yanagi et al. |
| 2009/0278122 A1 | 11/2009 | Hosono et al. |
| 2009/0280600 A1 | 11/2009 | Hosono et al. |
| 2009/0310077 A1 | 12/2009 | Kim et al. |
| 2009/0321731 A1 | 12/2009 | Jeong et al. |
| 2010/0001259 A1 | 1/2010 | Saitho et al. |
| 2010/0051936 A1 | 3/2010 | Hayashi et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0214272 A1 | 8/2010 | Watsuda |
| 2011/0007060 A1 | 1/2011 | Jarupoonphol et al. |
| 2011/0037787 A1 | 2/2011 | Yoshiga |
| 2011/0050733 A1 | 3/2011 | Yano et al. |
| 2011/0108706 A1 | 5/2011 | Koyama |
| 2011/0148846 A1 | 6/2011 | Arasawa et al. |
| 2015/0255043 A1 | 9/2015 | Miyake |
| 2016/0232868 A1 | 8/2016 | Yamazaki et al. |
| 2016/0357045 A1 | 12/2016 | Kimura |

FOREIGN PATENT DOCUMENTS

| | | |
|---|---|---|
| EP | 1737044 A | 12/2006 |
| EP | 2020686 A | 2/2009 |
| EP | 2226847 A | 9/2010 |
| EP | 2280390 A | 2/2011 |
| JP | 60-198861 A | 10/1985 |
| JP | 63-088523 A | 4/1988 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 03-043785 A | 2/1991 |
| JP | 05-251705 A | 9/1993 |
| JP | 07-104246 A | 4/1995 |
| JP | 08-264794 A | 10/1996 |
| JP | 11-505377 | 5/1999 |
| JP | 11-202292 A | 7/1999 |
| JP | 2000-044236 A | 2/2000 |
| JP | 2000-081606 A | 3/2000 |
| JP | 2000-150900 A | 5/2000 |
| JP | 2001-282205 A | 10/2001 |
| JP | 2002-076356 A | 3/2002 |
| JP | 2002-289859 A | 10/2002 |
| JP | 2003-044011 A | 2/2003 |
| JP | 2003-086000 A | 3/2003 |
| JP | 2003-086808 A | 3/2003 |
| JP | 2003-150080 A | 5/2003 |
| JP | 2003-150127 A | 5/2003 |
| JP | 2004-045662 A | 2/2004 |
| JP | 2004-103957 A | 4/2004 |
| JP | 2004-273614 A | 9/2004 |
| JP | 2004-273732 A | 9/2004 |
| JP | 2007-139009 A | 6/2007 |
| JP | 2008-033297 A | 2/2008 |
| JP | 2008-070783 A | 3/2008 |
| JP | 2008-287032 A | 11/2008 |
| JP | 2009-038757 A | 2/2009 |
| JP | 2010-197417 A | 9/2010 |
| JP | 6060142 | 1/2017 |
| KR | 2003-0091303 A | 12/2003 |
| TW | 493152 | 7/2002 |
| TW | 509886 | 11/2002 |
| TW | 200302937 | 8/2003 |
| TW | 559700 | 11/2003 |
| TW | 200515350 | 5/2005 |
| TW | I288909 | 10/2007 |
| TW | 200809721 | 2/2008 |
| WO | WO-2002/007142 | 1/2002 |
| WO | WO-2003/052731 | 6/2003 |
| WO | WO-2003/100508 | 12/2003 |
| WO | WO-2004/114391 | 12/2004 |
| WO | WO-2007/139009 | 12/2007 |
| WO | WO-2007/141732 | 12/2007 |
| WO | WO-2007/148653 | 12/2007 |
| WO | WO-2011/077925 | 6/2011 |

OTHER PUBLICATIONS

International Search Report (Application No. PCT/JP2010/071623) dated Mar. 8, 2011.

Written Opinion (Application No. PCT/JP2010/071623) dated Mar. 8, 2011.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Asaoka.Y et al., "29.1: Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Tranactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "Rfcpus on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Hayashi.R et al.,"42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDs", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

(56) References Cited

OTHER PUBLICATIONS

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters), 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MoO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phses for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,YbFe2O4, and Yb2Fe3O7 Types of Structures for Compounds in the In2O3 and Sc2O3—A2O3—BO Sysmtems [A; Fe, Ga, or Al: B: Mg, Mn, Fe, Ni, Cu,or Zn] at Temperaures Over 1000 ° C.", Journal of Solid State Chemistry, 1985, vol. 60, pp. 382-384.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits, 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED", IDW '06 : Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "Suftla Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White TANDEM OLEDs", SID Digest '09 : SID International Symposium Digest of Technical Papers, May 31, 2009, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of The Electrochemical Society), 2008, vol. 155, No. 12, pp. H1009-H1014.

Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 Inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, vol. 40, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

(56) References Cited

OTHER PUBLICATIONS

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.
Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.
Park.J et al., "High performance amorphous oxide thin film transistors with self-aligned top-gate structure", IEDM 09: Technical Digest of International Electron Devices Meeting, Dec. 7, 2009, pp. 191-194.
Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.
Park.S et al., "Challenge to Future Displays: Transparent AM-OLED Driven by PEALD Grown ZnO TFT", IMID '07 Digest, 2007, pp. 1249-1252.
Park.S et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.
Prins.M et al., "A Ferroelectric Transparent Thin-Film Transistor", Appl. Phys. Lett. (Applied Physics Letters), Jun. 17, 1996, vol. 68, No. 25, pp. 3650-3652.
Sakata.J et al., "Development of 4.0-In. AMOLED Display With Driver Circuit Using Amorphous In—Ga—Zn-Oxide TFTs", IDW '09 : Proceedings of The 16th International Display Workshops, 2009, pp. 689-692.
Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.
Takahashi.M et al., "Theoretical Analysis of IGZO Transparent Amorphous Oxide Semiconductor", IDW '08 : Porceedings of The 15th International Display Workshops, Dec. 3, 2008, pp. 1637-1640.
Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.
Van de Walle.C, "Hydrogen as a Cause of Doping in Zinc Oxide", Phys. Rev. Lett. (Physical Review Letters), Jul. 31, 2000, vol. 85, No. 5, pp. 1012-1015.
Nishi.T et al., "P-143: Possibility of Reflective LC Display Using Oxide Semiconductor TFTs as Electronic Paper Display", SID Digest '10 : SID International Symposium Digest of Technical Papers, May 1, 2010, vol. 41, No. 1, pp. 1685-1688.
Amano.S et al., "Low Power Lc Display Using In—Ga—Zn-Oxide TFTs Based on Variable Frame Frequency", SID Digest '10 : SID International Symposium Digest of Technical Papers, 2010, vol. 41, pp. 626-629.
Godo.H et al., "Modeling and Measurement of Ultra-Low Leakage Current of IGZO TFTs and New Driving Method of LCDs", IDW '10 : Proceedings of The 16th International Display Workshops, 2010, pp. 235-238.
Korean Office Action (Application No. 2012-7018791) dated Jul. 30, 2014.
Korean Office Action (Application No. 2012-7018791) dated Jan. 30, 2015.
Taiwanese Office Action (Application No. 099143988) dated May 6, 2015.
Taiwanese Office Action (Application No. 104133213) dated Jul. 11, 2016.

\* cited by examiner

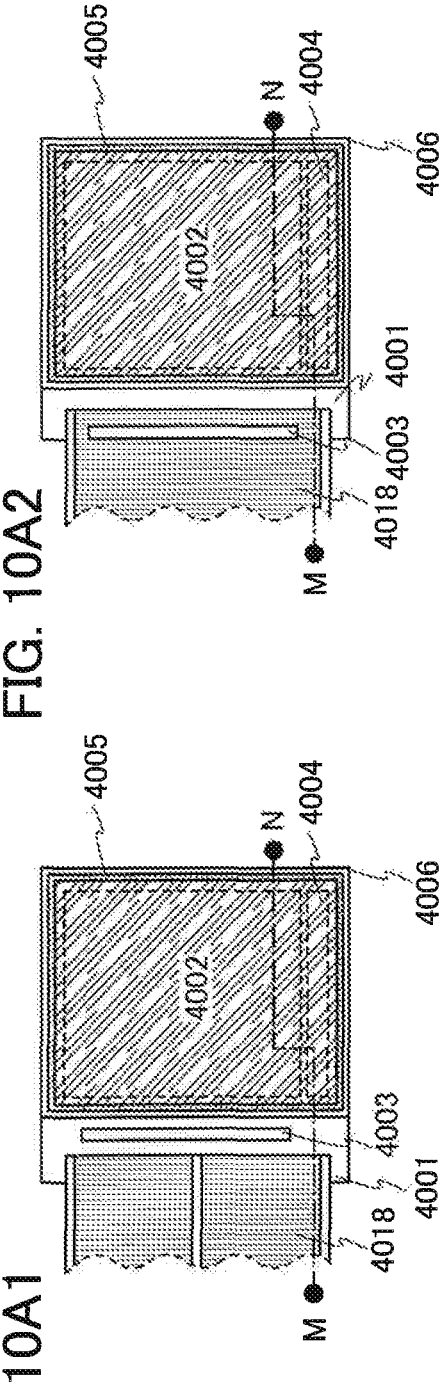
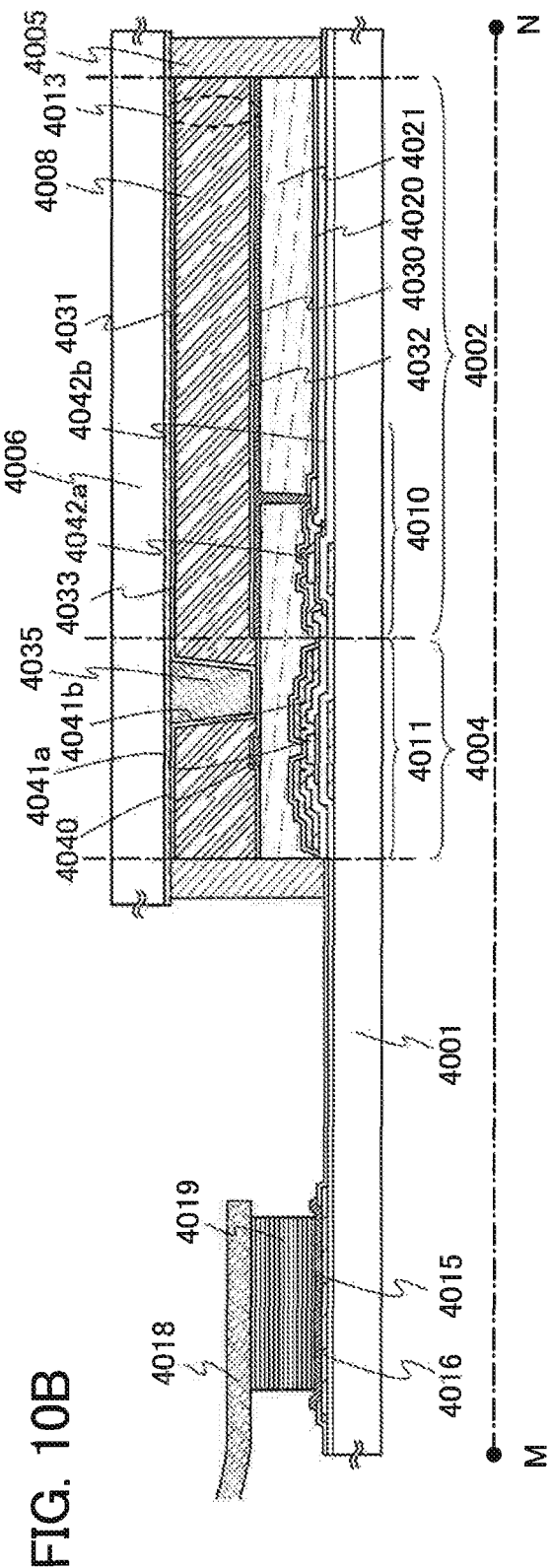

METHOD FOR DRIVING LIQUID CRYSTAL DISPLAY DEVICE

CROSS-REFERENCE TO RELATED APPLICATIONS

This application is a continuation of U.S. application Ser. No. 12/976,431, filed Dec. 22, 2010, now allowed, which claims the benefit of a foreign priority application filed in Japan as Serial No. 2009-295608 on Dec. 25, 2009, both of which are incorporated by reference.

TECHNICAL FIELD

The present invention relates to a method for driving a liquid crystal display device, a liquid crystal display device, or an electronic device including a liquid crystal display device.

BACKGROUND ART

Liquid crystal display devices are widely used in large display devices such as television sets and small display devices such as mobile phones. Higher value-added devices have been demanded and the development has progressed. In recent years, attention is attracted to the development of low power consumption liquid crystal display devices, in terms of the increase in interest in global environment and improvement in convenience of mobile devices.

Non-Patent Document 1 discloses a structure in which the refresh rate in the case of displaying a moving image and that in the case of displaying a still image are different from each other in order to reduce power consumption of a liquid crystal display device. Moreover, Non-Patent Document 1 discloses a structure in which, in order to prevent flickers from being perceived with change in drain-common voltage due to switching of signals in a break period and a scanning period when a still image is displayed, alternating-current signals with the same phase are applied to a signal line and a common electrode also in a break period so that the drain-common voltage does not change.

REFERENCE

Non-Patent Document 1: Kazuhiko Tsuda, et al., "Ultra low power consumption technologies for mobile TFT-LCDs", IDW'02, pp. 295-298 (2002)

DISCLOSURE OF INVENTION

As in Non-Patent Document 1, lower power consumption can be realized by a reduction in refresh rate. However, a voltage between a pixel electrode and a common electrode cannot be kept constant in some cases because the potential of the pixel electrode is changed by the off-state current of a pixel transistor and/or leakage current from liquid crystals. Therefore, a displayed image deteriorates because a voltage applied to the liquid crystals is changed.

An object is described in detail, using a specific example shown in drawings. FIG. 14A is a schematic diagram of a display panel in a liquid crystal display device. A display panel 1400 in FIG. 14A includes a pixel portion 1401, a gate line (also referred to as a scan line) 1402, a signal line (also referred to as a data line) 1403, a pixel 1404, a common electrode 1405, a capacitor line 1406, and a terminal portion 1407.

FIG. 14B illustrates the pixel 1404 in FIG. 14A. The pixel 1404 includes a pixel transistor 1408, a liquid crystal element 1409, and a capacitor 1410. A gate of the pixel transistor 1408 is connected to the gate line 1402. A first terminal serving as one of a source and a drain of the pixel transistor 1408 is connected to the signal line 1403. A second terminal serving as the other of the source and the drain of the pixel transistor 1408 is connected to one electrode of the liquid crystal element 1409 and a first electrode of the capacitor 1410. The other electrode of the liquid crystal element 1409 is connected to the common electrode 1405. A second electrode of the capacitor 1410 is connected to the capacitor line 1406. Note that the pixel transistor 1408 is a thin film transistor (TFT) including a thin semiconductor layer.

FIG. 14C illustrates the pixel 1404 in a manner different from FIG. 14B in order to focus on each of the wirings and the elements. The reference numerals of the wirings and the elements are the same as those in FIG. 14B. Note that for description of the liquid crystal element 1409, FIG. 14C illustrates a pixel electrode 1411 as the electrode on the pixel transistor 1408 side, a counter electrode 1412 as the electrode on the common electrode 1405 side, and a liquid crystal 1413 placed between the pixel electrode 1411 and the counter electrode 1412.

FIG. 15A illustrates the same diagram as FIG. 14C and focuses on a potential of each wiring, a voltage between electrodes, and a current flowing through each element. An image signal supplied to the signal line 1403 is a voltage $V_{data}$. A voltage held in the pixel electrode 1411 is $V_{pix}$. A voltage of the counter electrode 1412 is $V_{com}$. A voltage applied to the liquid crystal 1413 is $V_{LC}$. FIG. 15A also illustrates an off-state current $I_{TFT}$ of the pixel transistor and a current $I_{LC}$ flowing through the liquid crystal.

FIG. 15B is a general timing chart showing the potential of each wiring and the voltage between electrodes illustrated in FIG. 15A. In the timing chart in FIG. 15B, a period is divided into periods F1 to F4. The following description is made on the assumption that the same image, that is, a still image is displayed in the periods F1 to F4. That is, in the periods F1 to F4, the voltage $V_{LC}$ applied to the liquid crystal 1413 is a constant voltage $V_{data}$ (indicated by an arrow 1501 in FIG. 15B). It is known that the liquid crystal element 1409 deteriorates by application of voltage in one direction to the liquid crystal 1413, and that inversion driving is commonly used in which the polarity of voltage applied to the liquid crystal element 1409 is inverted per predetermined period. For example, when inversion driving is performed in the periods F1 to F4, a voltage whose polarity is changed per predetermined period, such as $V_{LC}$ (inversion driving) in FIG. 15B, is applied to the liquid crystal element 1409 even when the same image is displayed.

When the refresh rate is reduced in order to decrease power consumption in displaying a still image, each of the periods F1 to F4 is extended. As the period is extended, the voltage ($V_{pix}$) held in the pixel electrode 1411 is changed to rise or fall from $V_{data}$ (indicated by an arrow 1502 or an arrow 1503 in FIG. 15B) due to the off-state current $I_{TFT}$ and/or the current $I_{LC}$ flowing through the liquid crystal. On the other hand, the voltage $V_{com}$ of the counter electrode 1412 is fixed. The voltage $V_{LC}$ that is actually applied to the liquid crystal 1413 is significantly changed at the boundary between the periods F1 to F4 (denoted by "refresh" in FIG. 15B), which contributes to image deterioration when a still image is displayed.

In view of the above, an object of one embodiment of the present invention is to suppress deterioration of a displayed image even when a refresh rate is reduced in displaying a still image.

One embodiment of the present invention is a method for driving a liquid crystal display device. The liquid crystal display device includes a pixel transistor electrically connected to a pixel electrode, and a capacitor having one of electrodes electrically connected to the pixel electrode and the other of the electrodes electrically connected to a capacitor line. The pixel transistor is turned on and a voltage based on an image signal is supplied to the pixel electrode, and then, the pixel transistor is turned off so that a holding period during which the pixel electrode holds the voltage based on the image signal starts. A holding signal corresponding to change of the voltage based on the image signal in the pixel electrode in the holding period is supplied to the capacitor line so that a potential of the pixel electrode is constant.

One embodiment of the present invention is a method for driving a liquid crystal display device. The liquid crystal display device includes a pixel transistor electrically connected to a pixel electrode, and a capacitor having one of electrodes electrically connected to the pixel electrode and the other of the electrodes electrically connected to a capacitor line. The pixel transistor is turned on and a voltage based on an image signal is supplied to the pixel electrode, and then, the pixel transistor is turned off so that a holding period during which the pixel electrode holds the voltage based on the image signal starts. When the voltage based on the image signal in the pixel electrode rises in the holding period, a holding signal for controlling so as to lower the voltage based on the image signal is supplied to the capacitor line so that a potential of the pixel electrode is constant.

One embodiment of the present invention is a method for driving a liquid crystal display device. The liquid crystal display device includes a pixel transistor electrically connected to a pixel electrode, and a capacitor having one of electrodes electrically connected to the pixel electrode and the other of the electrodes electrically connected to a capacitor line. The pixel transistor is turned on and a voltage based on an image signal is supplied to the pixel electrode, and then, the pixel transistor is turned off so that a holding period during which the pixel electrode holds the voltage based on the image signal starts. When the voltage based on the image signal in the pixel electrode falls in the holding period, a holding signal for controlling so as to raise the voltage based on the image signal is supplied to the capacitor line so that a potential of the pixel electrode is constant.

In the method for driving a liquid crystal display device according to one embodiment of the present invention, a semiconductor layer of the pixel transistor may be an oxide semiconductor.

In the method for driving a liquid crystal display device according to one embodiment of the present invention, the holding period may be 60 seconds or longer.

In the method for driving a liquid crystal display device according to one embodiment of the present invention, the liquid crystal display device may be driven with frame inversion driving, common inversion driving, source line inversion driving, gate line inversion driving, or dot inversion driving per frame period.

According to one embodiment of the present invention, deterioration of a displayed image can be suppressed even when the refresh rate is reduced in displaying a still image.

BRIEF DESCRIPTION OF DRAWINGS

In the accompanying drawings:

FIGS. 10A1, 10A2, and 10B each illustrate a diagram for explaining a liquid crystal display device of one embodiment of the present invention;

BEST MODE FOR CARRYING OUT THE INVENTION

Figure 1A:
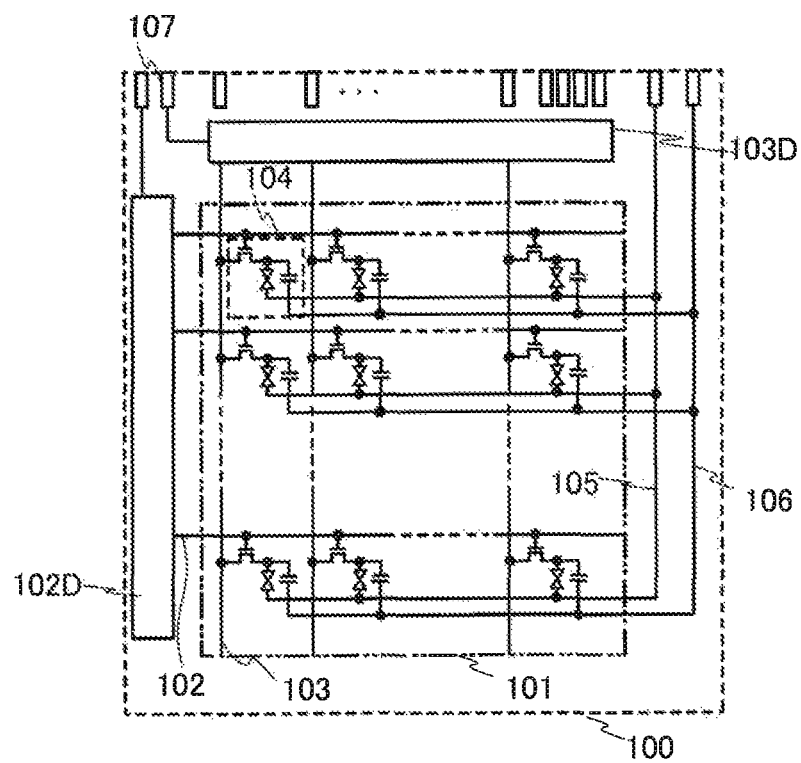
FIGS. 1A to 1C each illustrate a diagram for explaining a circuit diagram of one embodiment of the present invention.

Embodiments of the present invention will be described below with reference to the accompanying drawings. Note that the present invention can be carried out in many different modes, and it is easily understood by those skilled in the art that modes and details of the present invention can be modified in various ways without departing from the spirit and the scope of the present invention. Therefore, the present invention is not construed as being limited to the following description of the embodiments. Note that in structures of the present invention described below, reference numerals denoting the same portions are used in common in different drawings.

Note that the size of a component, the thickness of a layer, a region, or distortion of signal waveform illustrated in drawings in embodiments is exaggerated for simplicity in some cases. Therefore, embodiments of the present invention are not limited to such scales.

Note that terms "first", "second", "third" to "Nth" (N is a natural number) employed in this specification are used in order to avoid confusion between components and do not set a limitation on number.

Embodiment 1

For explaining this embodiment, FIG. 1A illustrates a schematic diagram of a display panel in a liquid crystal display device. A display panel 100 in FIG. 1A includes a pixel portion 101, a gate line (also referred to as a scan line)

102, a signal line (also referred to as a data line) 103, a pixel 104, a common electrode 105, a capacitor line 106, a terminal portion 107, a gate line driver circuit 102D, and a signal line driver circuit 103D.

Figure 14A:
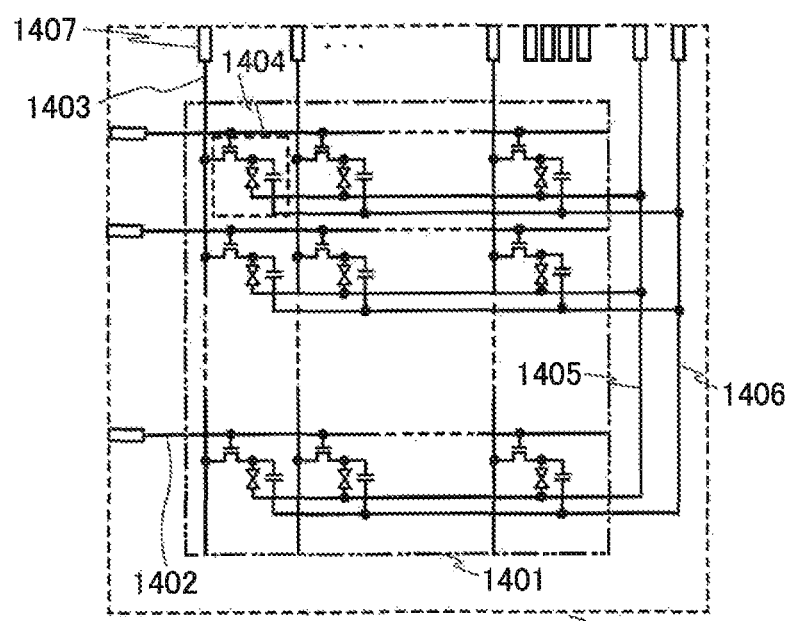
FIGS. 14A to 14C are diagrams for explaining an object.
Figure 14B:
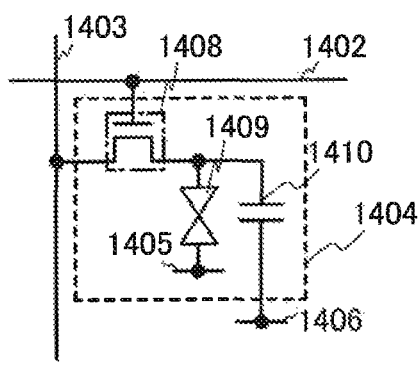

Note that FIG. 1A illustrates the structure in which the gate line driver circuit 102D and the signal line driver circuit 103D are provided over the display panel 100; as in FIG. 14A, the gate line driver circuit 102D and the signal line driver circuit 103D are not necessarily provided over the display panel 100. When the gate line driver circuit 102D and the signal line driver circuit 103D are provided over the display panel 100, the number of terminals in the terminal portion 107 can be reduced and the size of the liquid crystal display device can be reduced.

The pixels 104 are arranged (placed) in matrix. Here, the expression "pixels are arranged (placed) in matrix" includes the case where the pixels are arranged in a straight line and the case where the pixels are arranged in a jagged line, in a longitudinal direction or a lateral direction. Accordingly, in the case of performing full color display with three color elements (e.g., RGB), the expression "pixels are arranged (placed) in matrix" also includes the case where pixels are arranged in stripes and the case where dots of the three color elements are arranged in a delta pattern.

Figure 1B:
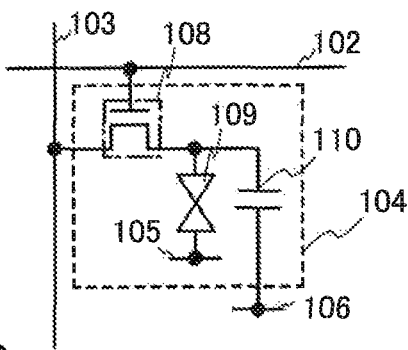

FIG. 1B illustrates the pixel 104 in FIG. 1A. The pixel 104 includes a pixel transistor 108, a liquid crystal element 109, and a capacitor 110. A gate of the pixel transistor 108 is connected to the gate line 102. A first terminal serving as one of a source and a drain of the pixel transistor 108 is connected to the signal line 103. A second terminal serving as the other of the source and the drain of the pixel transistor 108 is connected to one electrode of the liquid crystal element 109 and a first electrode of the capacitor 110. The other electrode of the liquid crystal element 109 is connected to the common electrode 105. A second electrode of the capacitor 110 is connected to the capacitor line 106. Note that the pixel transistor 108 is a thin film transistor (TFT) including a thin semiconductor layer.

Note that when it is explicitly described that "A and B are connected," the case where A and B are electrically connected, the case where A and B are functionally connected, and the case where A and B are directly connected are included therein.

Note that as the pixel transistor 108, a thin film transistor (TFT) including amorphous silicon, polycrystalline silicon, microcrystalline (also referred to as microcrystal or semi-amorphous) silicon, or single crystal silicon can be used. A transistor including a compound semiconductor or an oxide semiconductor such as ZnO, a-InGaZnO, SiGe, or GaAs; a thin film transistor obtained by thinning such a compound semiconductor or oxide semiconductor; or the like can be used. Accordingly, the manufacturing temperature can be lowered and for example, such a transistor can be formed at room temperature.

Note that one pixel corresponds to one element whose brightness can be controlled. Therefore, for example, one pixel corresponds to one color element and brightness is expressed with one color element. Accordingly, in the case of a color display device having color elements of R (Red), G (Green), and B (Blue), a minimum unit of an image is composed of three pixels of an R pixel, a G pixel, and a B pixel. Note that a color that is different from R, G, and B may be used for a color element. For example, three pixels of yellow, cyan, and magenta may be used.

Note that a thin film transistor is an element having at least three terminals of gate, drain, and source. The thin film transistor includes a channel region between a drain region and a source region, and a current can flow through the drain region, the channel region, and the source region. Here, since the source and the drain of the transistor may change depending on the structure, the operating condition, and the like of the transistor, it is difficult to define which is a source or a drain. Therefore, in this document (the specification, the claims, the drawings, and the like), a region functioning as a source or a drain is not called a source or a drain in some cases. In such a case, for example, one of the source and the drain is referred to as a first terminal, a first electrode, or a source region and the other of the source and the drain is referred to as a second terminal, a second electrode, or a drain region in some cases.

Figure 1C:
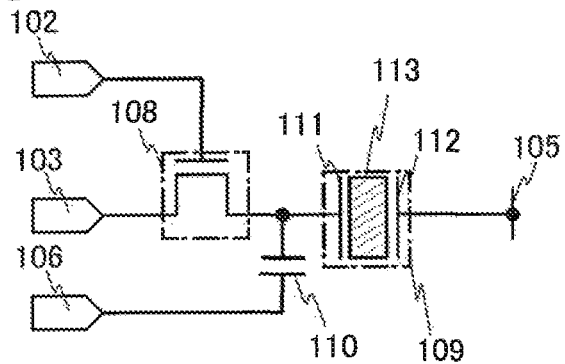
Figure 14C:
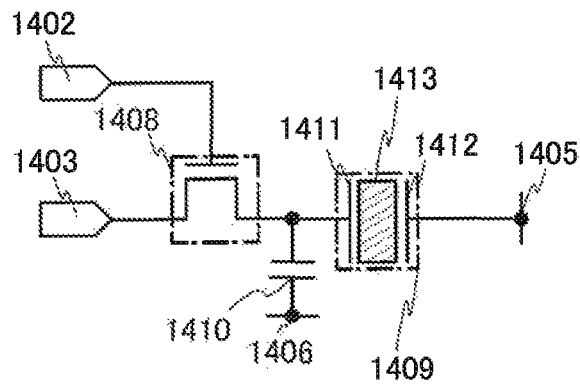

FIG. 1C illustrates the pixel 104 in a manner different from FIG. 1B in order to focus on each of the wirings and the elements. The reference numerals of the wirings and the elements are the same as those in FIG. 1B. Note that for description of the liquid crystal element 109, FIG. 1C illustrates a pixel electrode 111 as the electrode on the pixel transistor 108 side, a counter electrode 112 as the electrode on the common electrode 105 side, and a liquid crystal 113 placed between the pixel electrode 111 and the counter electrode 112. FIG. 1C differs from FIG. 14C in that instead of supplying a fixed voltage to the capacitor line 106 connected to the second electrode of the capacitor 110, a signal whose voltage is changed per predetermined period is supplied to the second electrode of the capacitor 110.

Figure 2A:
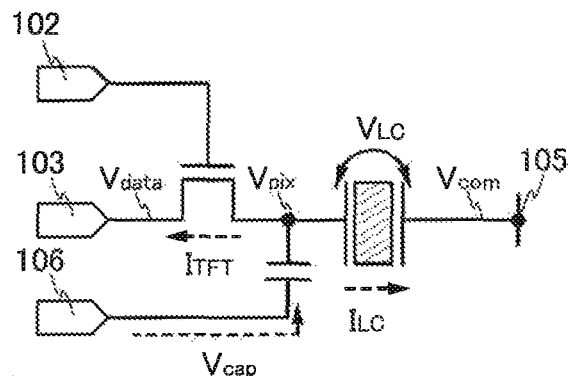
FIGS. 2A and 2B are diagrams for explaining a timing chart of one embodiment of the present invention.
Figure 15A:
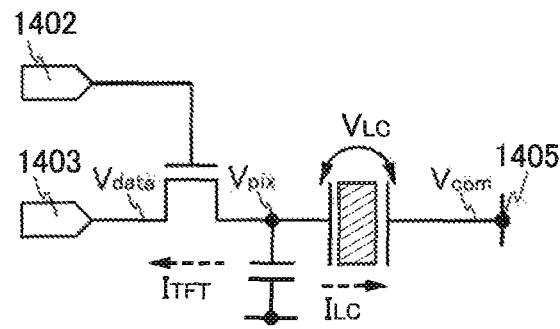
FIGS. 15A and 15B are diagrams for explaining an object.

FIG. 2A illustrates the same diagram as FIG. 1C, and focuses on a potential of each wiring, a voltage between electrodes, and a current flowing through each element as in FIG. 15A. An image signal supplied to the signal line 103 is a voltage $V_{data}$. A signal supplied to the capacitor line 106 (a holding signal) is a voltage $V_{cap}$. A voltage held in the pixel electrode 111 is $V_{pix}$. A voltage of the counter electrode 112 is $V_{com}$. A voltage applied to the liquid crystal 113 is $V_{LC}$. FIG. 2A also illustrates an off-state current $I_{TFT}$ of the pixel transistor and a current $I_{LC}$ flowing through the liquid crystal 113.

Specifically, there is a period during which the pixel transistor is turned on and the voltage $V_{data}$ based on an image signal is supplied to the pixel electrode 111 in order to write an image signal into a pixel (the period is hereinafter referred to as a writing period), and a voltage held in the pixel electrode 111 is $V_{pix}$. The voltage $V_{pix}$ is held by turning off the pixel transistor. Note that in a period for holding $V_{pix}$ (hereinafter referred to as a holding period), $V_{pix}$ is changed to rise or fall because of the off-state current $I_{TFT}$ and/or the current $I_{LC}$; thus, it is necessary to regularly perform refresh operation. Note that a writing period and a holding period can be collectively referred to as one frame period.

Note that in this specification, a writing period is extremely shorter than a holding period. For that reason, in some cases, a writing period is not shown in a timing chart and a holding period is described as one frame period.

When a thin film transistor in which an oxide semiconductor is used for a semiconductor layer is used as the pixel transistor, the off-state current $I_{TFT}$ can be extremely reduced. Thus, it is possible to obtain a structure in which only the current $I_{LC}$ flowing through the liquid crystal 113 is largely contributed to change in voltage $V_{pix}$. As a result, the holding period can be drastically extended to 60 seconds or more, and the refresh rate can be significantly reduced.

Note that voltage often refers to a potential difference between a given potential and a reference potential (e.g., a ground potential). Accordingly, voltage, potential, and potential difference can be referred to as potential, voltage, and voltage difference, respectively.

Figure 2B:
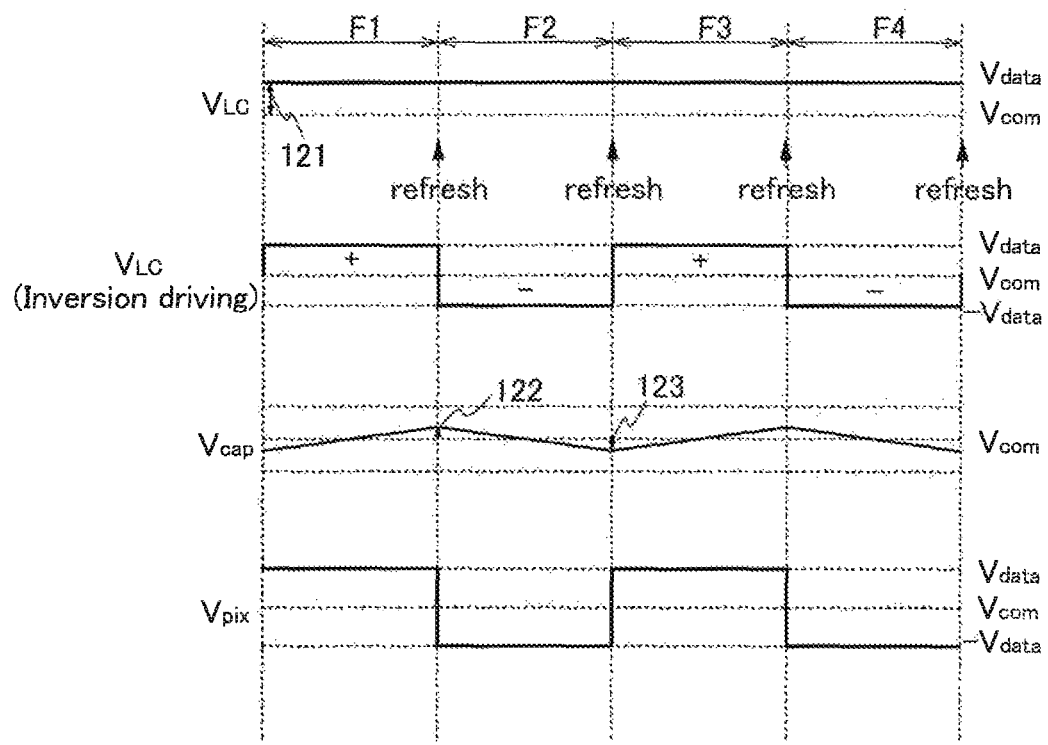
Figure 15B:
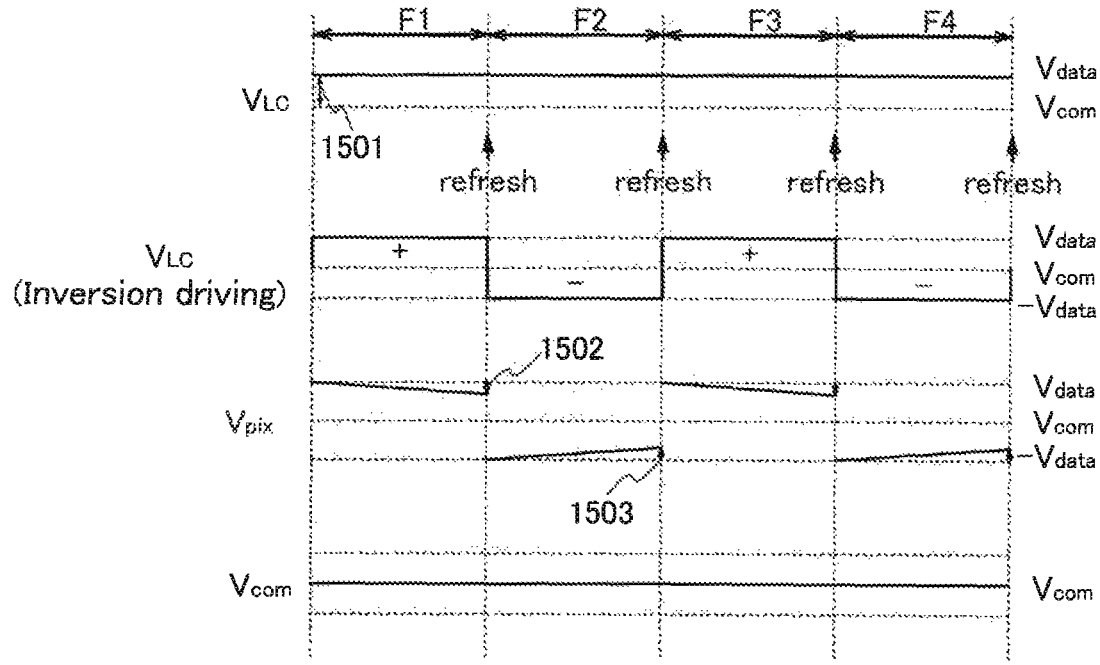

Like FIG. 15B, FIG. 2B illustrates a general timing chart showing the potential of each wiring and the voltage between electrodes illustrated in FIG. 2A. In the timing chart in FIG. 2B, a period is divided into periods F1 to F4. The following description is made on the assumption that the same image, that is, a still image is displayed in the periods F1 to F4. That is, in the periods F1 to F4, the voltage $V_{LC}$ applied to the liquid crystal 113 is a constant voltage $V_{data}$, (indicated by an arrow 121 in FIG. 2B). It is known that the liquid crystal element 109 deteriorates by application of voltage in one direction to the liquid crystal 113, and that inversion driving is commonly used in which the polarity of voltage applied to the liquid crystal element is inverted per predetermined period. For example, frame inversion driving is realized when each of the periods F1 to F4 is regarded as one frame period and inversion driving is performed per frame period; a voltage whose polarity is changed per predetermined period, such as $V_{LC}$ (inversion driving) in FIG. 2B, is applied to the liquid crystal element even when the same image is displayed.

When the refresh rate is reduced in order to decrease power consumption in displaying a still image, each of the periods F1 to F4 is extended. As the period is extended, the voltage $V_{pix}$ held in the pixel electrode 111 rises or falls because of the off-state current $I_{TFT}$ and/or the current $I_{LC}$ flowing through the liquid crystal, as described in FIG. 15B.

In the structure in this embodiment, image deterioration in displaying a still image is reduced in such a manner that the holding signal $V_{cap}$ compensates a voltage corresponding to the amount of rise or fall from $V_{data}$ of the voltage ($V_{pix}$) held in the pixel electrode 111 due to the off-state current $I_{TFT}$ and/or the current $I_{LC}$ flowing through the liquid crystal. Specifically, in the periods F1 to F4 each of which is one frame period, the voltage of the holding signal $V_{cap}$ is raised or lowered by the amount of change in voltage $V_{pix}$. (indicated by an arrow 122 or an arrow 123 in FIG. 2B). In other words, the voltage of the holding signal $V_{cap}$ is lowered when the voltage $V_{pix}$ is changed to rise, whereas the voltage of the holding signal $V_{cap}$ is raised when the voltage $V_{pix}$ is changed to fall. The voltage $V_{LC}$ applied between the voltage $V_{pix}$ and the voltage $V_{com}$ of the counter electrode 112 which is a fixed voltage is not much changed at the boundary between the periods F1 to F4 (denoted by "refresh" in FIG. 2B), and image deterioration in displaying a still image can be reduced. Note that $V_{LC}$ (inversion driving) is a voltage that is inverted in each of the periods F1 to F4, so that $V_{cap}$ is a signal that alternately repeats rise and fall. Note that the reduction in change of $V_{pix}$, that is, $V_{LC}$ by control of the voltage of the holding signal $V_{cap}$ as described above can be referred to as "making the voltage $V_{pix}$, that is, the voltage $V_{LC}$ constant"; it is to be noted that "constant" in this case includes minute change in voltage which hardly affects actual display.

Figure 3:
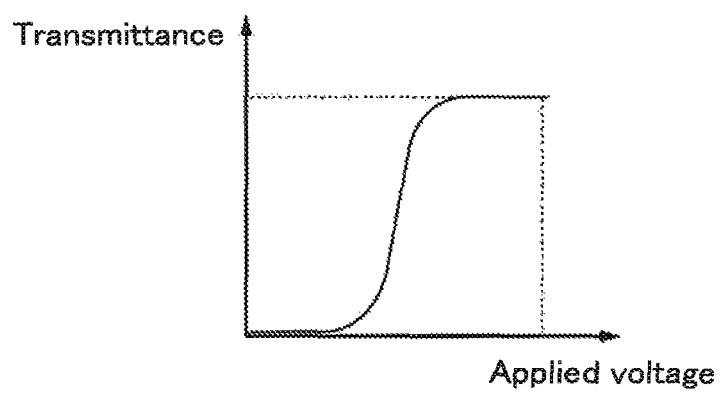
FIG. 3 illustrates a diagram for explaining an example of properties of a liquid crystal in one embodiment of the present invention.

Note that the amount indicated by the arrow 122 or the arrow 123 that corresponds to the amount of change in voltage is changed in accordance with an image signal. In particular, when an image signal is hardly supplied to the pixel electrode, the voltage rarely changes. FIG. 3 illustrates the relation between a transmittance and voltage applied to the liquid crystal 113. As seen from FIG. 3, there is no problem in the case where an image signal is hardly supplied to the pixel electrode, that is, in the case where an applied voltage is low, where the transmittance corresponding to the applied voltage is hardly changed when the applied voltage is changed a little.

Figure 4:
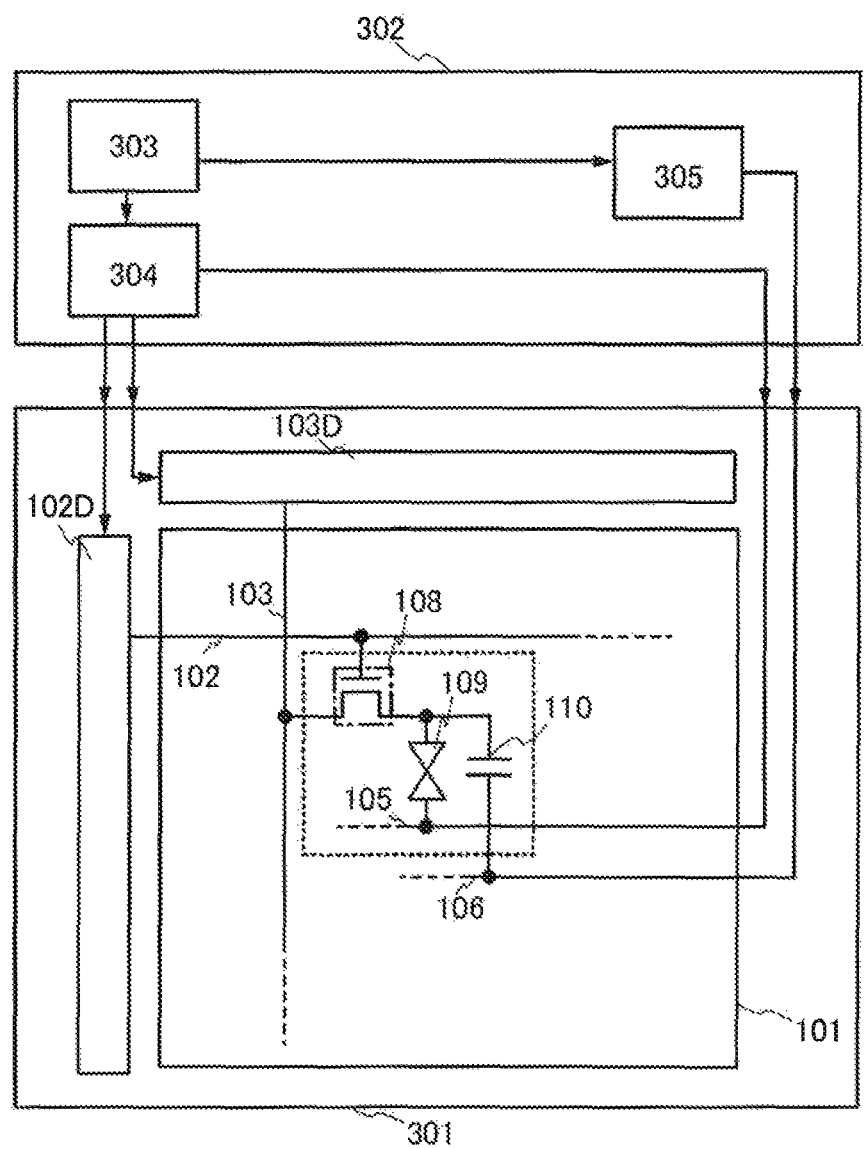
FIG. 4 illustrates a diagram for explaining a block diagram of one embodiment of the present invention.

FIG. 4 is a block diagram of a liquid crystal display device including a circuit that outputs the holding signal $V_{cap}$. The liquid crystal display device in FIG. 4 includes a display panel portion 301 and a peripheral circuit portion 302. The display panel portion 301 has a structure similar to that of the display panel 100 in FIG. 1A; therefore, the description is not repeated. The peripheral circuit portion 302 includes a circuit 303 for switching between a moving image and a still image (hereinafter referred to as an image switching circuit 303), a display control circuit 304, and a holding signal generation circuit 305. Note that the display panel portion 301 and the peripheral circuit portion 302 are preferably formed over different substrates; they may be formed over the same substrate.

The image switching circuit 303 judges whether image signals supplied from the outside are for a moving image or a still image and switches an image between a moving image and a still image. The image switching circuit 303 may automatically judge whether image signals supplied from the outside are for a moving image or a still image by comparing the image signals for subsequent frame periods, or may switch an image between a moving image and a still image in accordance with a signal from the outside.

The display control circuit 304 supplies a signal for displaying a moving image, for example, an image signal, a clock signal, and the like to the display panel portion 301 when the image switching circuit 303 judges that the image signals are for a moving image. On the other hand, when the image switching circuit 303 judges that the image signals are for a still image, the display control circuit 304 supplies a signal for displaying a still image, for example, an image signal, a clock signal, and the like to the display panel portion 301 at predetermined timing while reducing the refresh rate.

The holding signal generation circuit 305 generates the holding signal $V_{cap}$ supplied to the capacitor line 106 when the image switching circuit 303 judges that the image signals are for a still image. When the image switching circuit 303 judges that the image signals are for a moving image, the holding signal generation circuit 305 supplies a given constant voltage, for example, a signal same as the common voltage $V_{com}$ to the display panel portion 301.

Note that a high power supply potential VDD refers to a potential that is higher than a reference potential, and a low power supply potential VSS refers to a potential that is lower than or equal to the reference potential. Both the high power supply potential and the low power supply potential are preferably potentials with which a thin film transistor can operate. Note that the high power supply potential VDD and the low power supply potential VSS are collectively referred to as a power supply voltage in some cases.

Figure 5:
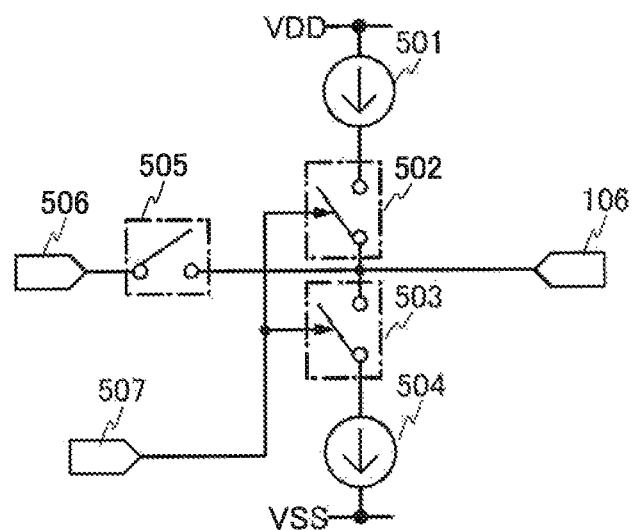
FIG. 5 illustrates a diagram for explaining a circuit diagram of one embodiment of the present invention.

An example of the structure of the holding signal generation circuit 305 is described with reference to FIG. 5. As an example, the holding signal generation circuit 305 illustrated in FIG. 5 includes a first current source circuit 501, a first switch 502, a second switch 503, a second current source circuit 504, and a third switch 505. The holding signal generation circuit 305 in FIG. 5 controls rise or fall in voltage of the capacitor line 106 by the first current source circuit 501 and the second current source circuit 504 in such a manner that on/off of the first switch 502 and the second switch 503 is alternately switched by control of a switching terminal 507 in a period during which a still image is displayed. Note that when the voltage of the capacitor line 106 is a given constant voltage, the third switch 505 is turned on so that the capacitor line 106 is connected to a terminal 506 to which the common voltage $V_{com}$ is supplied.

Note that it is preferable that the first switch 502, the second switch 503, and the third switch 505 be transistors, and the first switch 502 and the second switch 503 be transistors with opposite polarities.

As described above, the structure shown in this embodiment can suppress deterioration of a displayed image even when the refresh rate is reduced in displaying a still image.

This embodiment can be implemented in appropriate combination with any of the components described in the other embodiments.

Embodiment 2

In this embodiment, a structure different from the structure described in Embodiment 1 will be described.

Figure 6A:
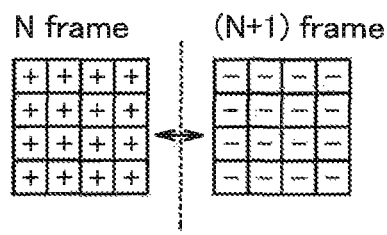
FIGS. 6A to 6D each illustrate a diagram for explaining a schematic diagram of one embodiment of the present invention.
Figure 6B:
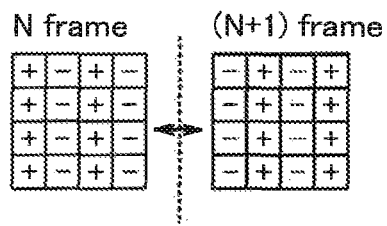
Figure 6C:
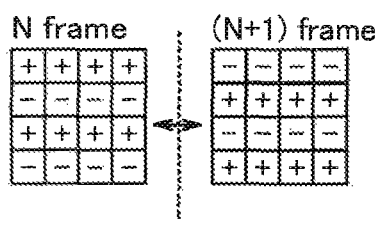
Figure 6D:
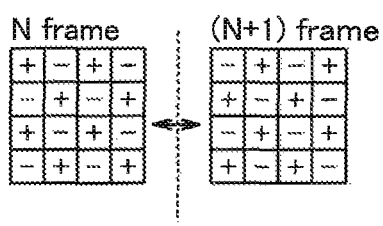

Embodiment 1 describes the structure for frame inversion driving illustrated in FIG. 6A; this embodiment explains source line inversion driving in which inversion driving with the polarity inverted per signal line is performed as illustrated in FIG. 6B, gate line inversion driving in which inversion driving with the polarity inverted per gate line is performed as illustrated in FIG. 6C, and dot inversion driving in which inversion driving with inverted polarity is performed between adjacent pixels as illustrated in FIG. 6D, by using a circuit configuration of a pixel, and the like. Note that the part of the same description as that in Embodiment 1 is not repeated. Operation for common inversion driving is the same as that for frame inversion driving; therefore, description of common inversion driving is omitted. Note that FIGS. 6A to 6D illustrate examples in which image signals with polarities inverted between an Nth frame (N is a natural number) and a (N+1)th frame are supplied (the polarity is denoted by a plus sign or a minus sign in FIGS. 6A to 6D); alternatively, another driving method may be employed.

The methods for inversion driving in FIGS. 6B to 6D are different from the method in FIG. 6A, which is the inversion driving in Embodiment 1, in that image signals of different polarities are supplied in one frame period; accordingly, a voltage supplied to a capacitor line is changed depending on the polarity of an image signal.

Figure 7A:
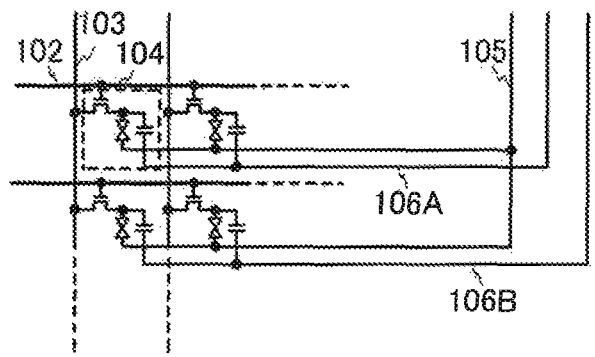
FIGS. 7A to 7C each illustrate a diagram for explaining a circuit diagram of one embodiment of the present invention.
Figure 7B:
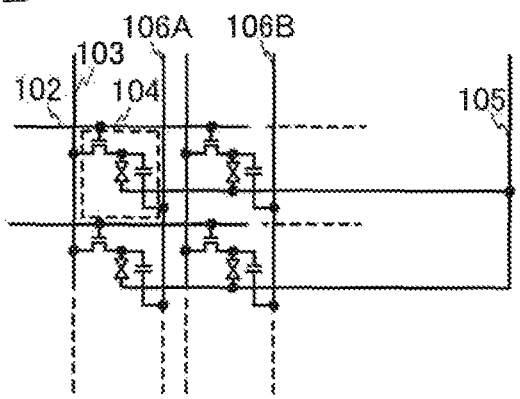
Figure 7C:
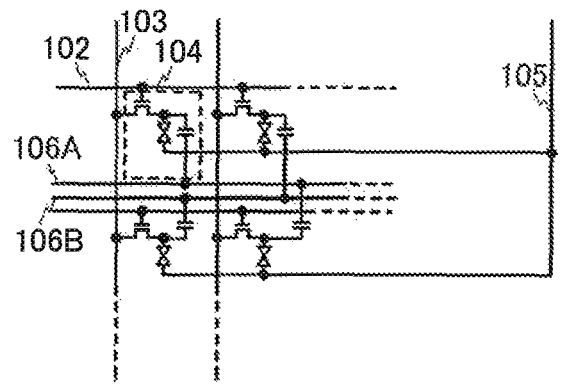

Specific description is made using simple circuit configurations. FIG. 7A illustrates a circuit configuration of a pixel for source line inversion driving, corresponding to FIG. 6B. FIG. 7A illustrates a gate line 102, a signal line 103, a pixel 104, a common electrode 105, a first capacitor line 106A, and a second capacitor line 106B. The first capacitor line 106A is connected to pixels to which image signals of one polarity are supplied, and the second capacitor line 106B is connected to other pixels to which image signals of a different polarity are supplied as illustrated in FIG. 6B. FIG. 7B illustrates a circuit configuration of a pixel for gate line inversion driving, corresponding to FIG. 6C. FIG. 7B illustrates a gate line 102, a signal line 103, a pixel 104, a common electrode 105, a first capacitor line 106A, and a second capacitor line 106B. The first capacitor line 106A is connected to pixels to which image signals of one polarity are supplied, and the second capacitor line 106B is connected to other pixels to which image signals of a different polarity are supplied as illustrated in FIG. 6C. FIG. 7C illustrates a circuit configuration of a pixel for dot inversion driving, corresponding to FIG. 6D. FIG. 7C illustrates a gate line 102, a signal line 103, a pixel 104, a common electrode 105, a first capacitor line 106A, and a second capacitor line 106B. The first capacitor line 106A is connected to pixels to which image signals of one polarity are supplied, and the second capacitor line 106B is connected to other pixels to which image signals of the different polarity are supplied as illustrated in FIG. 6D. The above-described first capacitor line 106A and second capacitor line 106B in FIGS. 7A to 7C are supplied with a first holding signal $V_{cap1}$ and a second holding signal $V_{cap2}$ which are different holding signals.

Figure 8A:
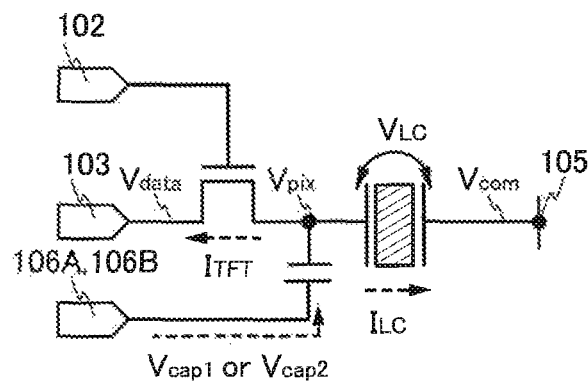
FIGS. 8A and 8B are diagrams for explaining a timing chart of one embodiment of the present invention.

FIG. 8A illustrates the same diagram as FIG. 2A and focuses on a potential of each wiring, a voltage between electrodes, and a current flowing through each element. The difference from FIG. 2A is that FIG. 8A illustrates the first holding signal $V_{cap1}$ and the second holding signal $V_{cap2}$ described with reference to FIGS. 7A to 7C.

Figure 8B:
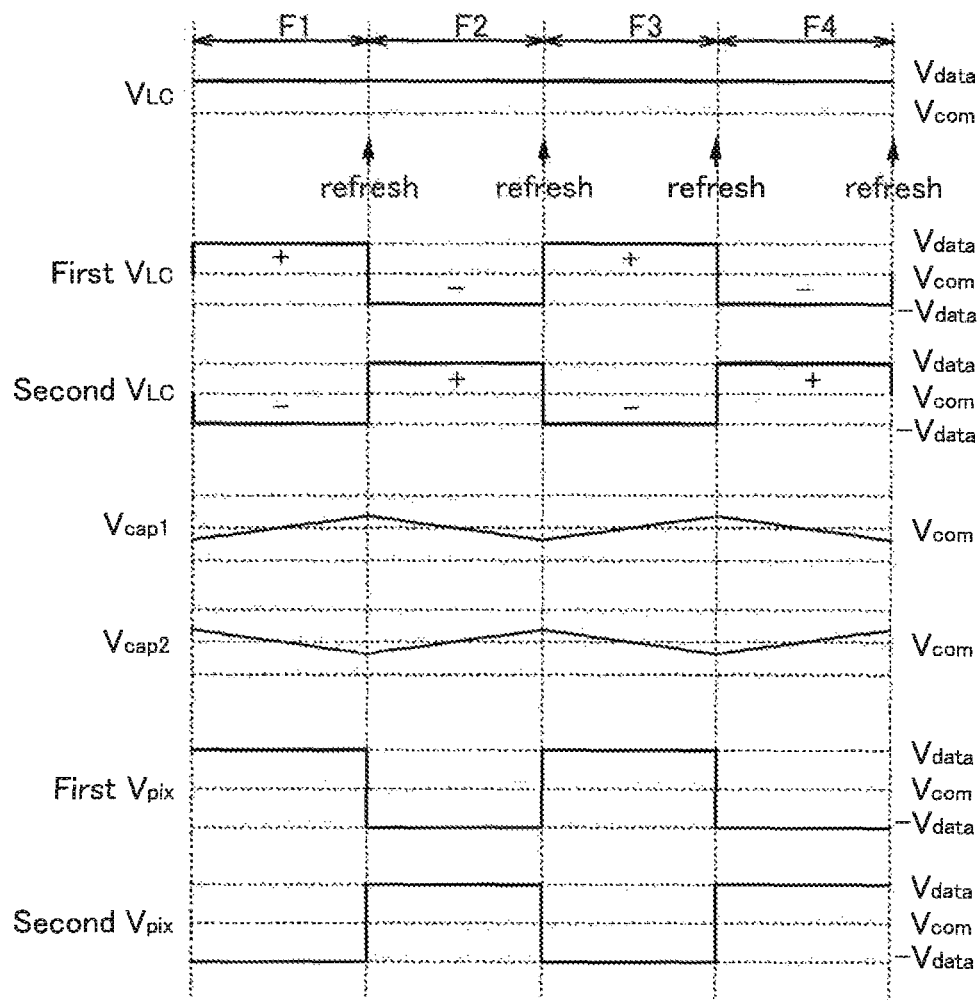

Like FIG. 2B, FIG. 8B illustrates a general timing chart showing the potential of each wiring and the voltage between electrodes illustrated in FIG. 8A. Image signals of different polarities are supplied to the liquid crystal element 109, and the liquid crystal 113 is supplied with a first voltage $V_{LC}$ and a second voltage $V_{LC}$ that are inverted per frame period. Then, the first holding signal $V_{cap1}$ or the second holding signal $V_{cap2}$ that compensates the amount of rise or fall in the voltage ($V_{pix}$) held in the pixel electrode 111 from $V_{data}$ due to the off-state current $I_{TFT}$ and/or the current $I_{LC}$ flowing through the liquid crystal is supplied. The first $V_{pix}$ and the second $V_{pix}$ in a pixel to which image signals of different polarities are supplied in the periods F1 to F4 each of which is one frame period are not much changed at the boundary between the periods F1 to F4 (denoted by "refresh" in FIG. 8B); thus, image deterioration in displaying a still image can be reduced.

As described above, the structure shown in this embodiment can suppress deterioration of a displayed image even when the refresh rate is reduced in displaying a still image.

This embodiment can be implemented in appropriate combination with any of the components described in the other embodiments.

Embodiment 3

In this embodiment, an example of a transistor that can be applied to a liquid crystal display device disclosed in this specification will be described.

FIGS. 9A to 9D each illustrate an example of a cross-sectional structure of a transistor.

Figure 9A:
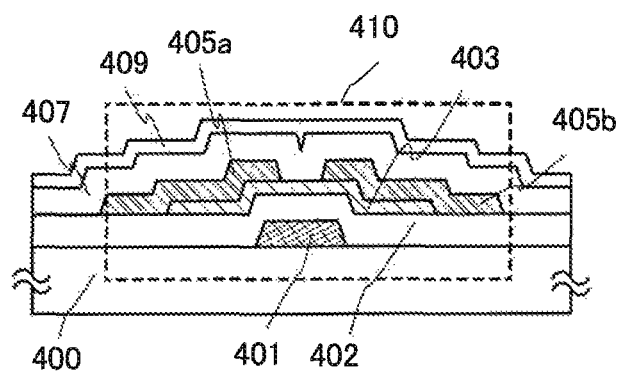
FIGS. 9A to 9D each illustrate a diagram for explaining a transistor of one embodiment of the present invention.

A transistor 410 illustrated in FIG. 9A is a kind of bottom-gate structure thin film transistor and is also called an inverted staggered thin film transistor.

The transistor 410 includes, over a substrate 400 having an insulating surface, a gate electrode layer 401, a gate insulating layer 402, an oxide semiconductor layer 403, a source electrode layer 405a, and a drain electrode layer 405b. An insulating layer 407 is provided to cover the transistor 410 and be stacked over the oxide semiconductor layer 403. A protective insulating layer 409 is provided over the insulating layer 407.

Figure 9B:
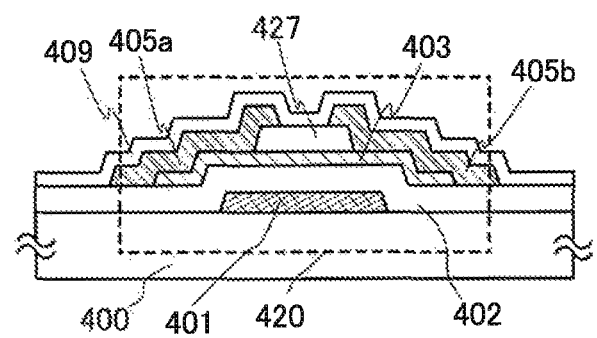

A transistor 420 illustrated in FIG. 9B has a kind of bottom-gate structure called a channel-protective type (channel-stop type) and is also referred to as an inverted staggered thin film transistor.

The transistor 420 includes, over a substrate 400 having an insulating surface, a gate electrode layer 401, a gate insulating layer 402, an oxide semiconductor layer 403, an insulating layer 427 that is provided over a channel formation region in the oxide semiconductor layer 403 and functions as a channel protective layer, a source electrode layer 405a, and a drain electrode layer 405b. A protective insulating layer 409 is provided to cover the transistor 420.

Figure 9C:
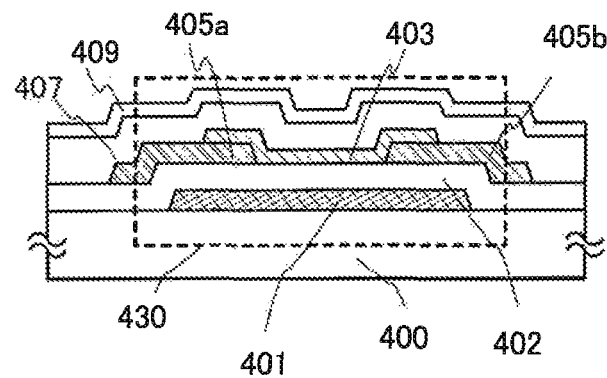

A transistor 430 illustrated in FIG. 9C is a bottom-gate type thin film transistor and includes, over a substrate 400 which is a substrate having an insulating surface, a gate electrode layer 401, a gate insulating layer 402, a source electrode layer 405*a*, a drain electrode layer 405*b*, and an oxide semiconductor layer 403. An insulating layer 407 is provided to cover the transistor 430 and be in contact with the oxide semiconductor layer 403. A protective insulating layer 409 is provided over the insulating layer 407.

In the transistor 430, the gate insulating layer 402 is provided in contact with the substrate 400 and the gate electrode layer 401. The source electrode layer 405*a* and the drain electrode layer 405*b* are provided in contact with the gate insulating layer 402. The oxide semiconductor layer 403 is provided over the gate insulating layer 402, the source electrode layer 405*a*, and the drain electrode layer 405*b*.

Figure 9D:
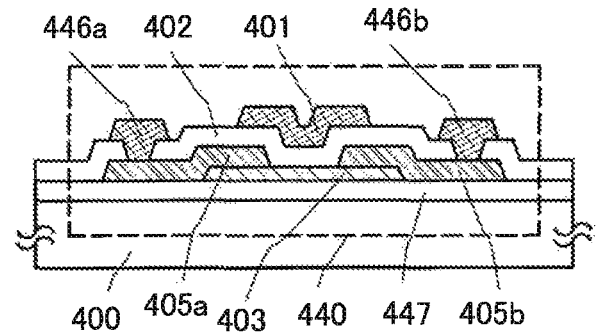

A transistor 440 illustrated in FIG. 9D is a kind of top-gate structure thin film transistor. The transistor 440 includes, over a substrate 400 having an insulating surface, an insulating layer 447, an oxide semiconductor layer 403, a source electrode layer 405*a* and a drain electrode layer 405*b*, a gate insulating layer 402, and a gate electrode layer 401. A wiring layer 446*a* and a wiring layer 446*b* are provided in contact with the source electrode layer 405*a* and the drain electrode layer 405*b*, respectively, to be electrically connected to the source electrode layer 405*a* and the drain electrode layer 405*b*, respectively.

In this embodiment, the oxide semiconductor layer 403 is used as a semiconductor layer.

As the oxide semiconductor layer 403, any of the following oxide semiconductor layers can be used: a quaternary metal oxide film such as an In—Sn—Ga—Zn—O film; a ternary metal oxide film such as an In—Ga—Zn—O film, an In—Sn—Zn—O film, an In—Al—Zn—O film, a Sn—Ga—Zn—O film, an Al—Ga—Zn—O film, or a Sn—Al—Zn—O film; a binary metal oxide film such as an In—Zn—O film, a Sn—Zn—O film, an Al—Zn—O film, a Zn—Mg—O film, a Sn—Mg—O film, or an In—Mg—O film; an In—O film, a Sn—O film, or a Zn—O film. Further, the above-described oxide semiconductor layer may contain $SiO_2$.

As the oxide semiconductor layer 403, a thin film expressed by $InMO_3(ZnO)_m$ (m>0) can be used. Here, M represents one or more metal elements selected from Ga, Al, Mn, and Co. For example, M can be Ga, Ga and Al, Ga and Mn, or Ga and Co. An oxide semiconductor film whose composition formula is represented by $InMO_3(ZnO)_m$ (m>0) where at least Ga is contained as M is referred to as an In—Ga—Zn—O oxide semiconductor, and a thin film thereof is also referred to as an In—Ga—Zn—O film.

Note that in the structure in this embodiment, the oxide semiconductor is an intrinsic (i-type) or substantially intrinsic semiconductor obtained by removal of hydrogen, which is an n-type impurity, from the oxide semiconductor for high purification so that the oxide semiconductor contains an impurity other than the main component as little as possible. In other words, the oxide semiconductor in this embodiment is a highly purified i-type (intrinsic) semiconductor or a substantially intrinsic semiconductor obtained by removing impurities such as hydrogen and water as much as possible, not by adding an impurity element. Therefore, the oxide semiconductor layer included in the thin film transistor is a highly purified and electrically i-type (intrinsic) oxide semiconductor layer.

The number of carriers in the highly purified oxide semiconductor is very small (close to zero), and the carrier concentration is less than $1\times10^{14}/cm^3$, preferably less than $1\times10^{12}/cm^3$, further preferably less than $1\times10^{11}/cm^3$.

The number of carriers in the oxide semiconductor is so small that the off-state current of the transistor can be reduced. Specifically, the off-state current of the thin film transistor including the oxide semiconductor layer (per channel width of 1 µm) can be reduced to 10 aA/µm ($1\times10^{-17}$ A/µm) or lower, further reduced to 1 aA/µm ($1\times10^{-18}$ A/µm) or lower, and still further reduced to 10 zA/µm ($1\times10^{-20}$ A/µm). In other words, in circuit design, the oxide semiconductor can be regarded as an insulator when the transistor is off. Moreover, when the thin film transistor is on, the current supply capability of the oxide semiconductor layer is expected to be higher than that of a semiconductor layer formed of amorphous silicon.

In each of the transistors 410, 420, 430, and 440 including the oxide semiconductor layer 403, the current in an off state (the off-state current) can be small. Thus, the retention time for an electric signal such as image data can be extended, and an interval between writings can be extended. As a result, the frequency of refresh can be reduced, so that power consumption can be further reduced.

Furthermore, the transistors 410, 420, 430, and 440 including the oxide semiconductor layer 403 can have relatively high field-effect mobility as the ones formed using an amorphous semiconductor, thus, the transistors can operate at high speed. As a result, high functionality and high-speed response of a display device can be realized.

Although there is no particular limitation on a substrate that can be used as the substrate 400 having an insulating surface, the substrate needs to have heat resistance at least high enough to withstand heat treatment to be performed later. A glass substrate made of barium borosilicate glass, aluminoborosilicate glass, or the like can be used.

In the case where the temperature of heat treatment to be performed later is high, a glass substrate whose strain point is greater than or equal to 730° C. is preferably used. For a glass substrate, a glass material such as aluminosilicate glass, aluminoborosilicate glass, or barium borosilicate glass is used, for example. Note that a glass substrate containing a larger amount of barium oxide (BaO) than boron oxide ($B_2O_3$), which is practical heat-resistant glass, may be used.

Note that a substrate formed of an insulator, such as a ceramic substrate, a quartz substrate, or a sapphire substrate, may be used instead of the glass substrate. Alternatively, crystallized glass or the like may be used. A plastic substrate or the like can be used as appropriate.

In the bottom-gate structure transistors 410, 420, and 430, an insulating film serving as a base film may be provided between the substrate and the gate electrode layer. The base film has a function of preventing diffusion of an impurity element from the substrate, and can be formed with a single-layer structure or a layered structure including a silicon nitride film, a silicon oxide film, a silicon nitride oxide film, and/or a silicon oxynitride film.

The gate electrode layer 401 can be formed with a single-layer structure or a layered structure using a metal material such as molybdenum, titanium, chromium, tantalum, tungsten, aluminum, copper, neodymium, or scandium or an alloy material containing any of these materials as its main component.

As a two-layer structure of the gate electrode layer 401, any of the following layered structures is preferably employed, for example: a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, or a two-layer structure in which a titanium nitride layer and a molybdenum layer are stacked. As a three-layer structure of the gate electrode layer 401, it is preferable to employ a stack of a tungsten layer or a tungsten nitride layer, a layer of an alloy of aluminum and silicon or an alloy of aluminum and titanium, and a titanium nitride layer or a titanium layer. Note that the gate electrode layer can be formed using a light-transmitting conductive film. An example of a material for the light-transmitting conductive film is a light-transmitting conductive oxide.

The gate insulating layer 402 can be formed with a single-layer structure or a layered structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like.

The gate insulating layer 402 can have a structure in which a silicon nitride layer and a silicon oxide layer are stacked from the gate electrode layer side. For example, a 100-nm-thick gate insulating layer is formed in such a manner that a silicon nitride layer ($SiN_y$ (y>0)) having a thickness of 50 nm to 200 nm is formed as a first gate insulating layer by a sputtering method and then a silicon oxide layer ($SiO_x$ (x>0)) having a thickness of 5 nm to 300 nm is stacked as a second gate insulating layer over the first gate insulating layer. The thickness of the gate insulating layer 402 may be set as appropriate depending on characteristics needed for a thin film transistor, and may be approximately 350 nm to 400 nm.

For a conductive film used for the source electrode layer 405a and the drain electrode layer 405b, an element selected from Al, Cr, Cu, Ta, Ti, Mo, and W, an alloy containing any of these elements, or an alloy film containing a combination of any of these elements can be used, for example. A structure may be employed in which a high-melting-point metal layer of Cr, Ta, Ti, Mo, W, or the like is stacked on one or both of a top surface and a bottom surface of a metal layer of Al, Cu, or the like. By using an aluminum material to which an element preventing generation of hillocks and whiskers in an aluminum film, such as Si, Ti, Ta, W, Mo, Cr, Nd, Sc, or Y, is added, heat resistance can be increased.

A conductive film serving as the wiring layers 446a and 446b connected to the source electrode layer 405a and the drain electrode layer 405b can be formed using a material similar to that of the source and drain electrode layers 405a and 405b.

The source electrode layer 405a and the drain electrode layer 405b may have a single-layer structure or a layered structure of two or more layers. For example, the source electrode layer 405a and the drain electrode layer 405b can have a single-layer structure of an aluminum film containing silicon, a two-layer structure in which a titanium film is stacked over an aluminum film, or a three-layer structure in which a titanium film, an aluminum film, and a titanium film are stacked in this order.

The conductive film to be the source electrode layer 405a and the drain electrode layer 405b (including a wiring layer formed using the same layer as the source and drain electrode layers) may be formed using a conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, referred to as ITO), an alloy of indium oxide and zinc oxide ($In_2O_3$—ZnO), or any of the metal oxide materials containing silicon or silicon oxide can be used.

As the insulating layers 407, 427, and 447 and the protective insulating layer 409, an inorganic insulating film such as an oxide insulating layer or a nitride insulating layer is preferably used.

As the insulating layers 407, 427, and 447, an inorganic insulating film such as a silicon oxide film, a silicon oxynitride film, an aluminum oxide film, or an aluminum oxynitride film can be typically used.

As the protective insulating layer 409, an inorganic insulating film such as a silicon nitride film, an aluminum nitride film, a silicon nitride oxide film, or an aluminum nitride oxide film can be used.

A planarization insulating film may be formed over the protective insulating layer 409 in order to reduce surface roughness due to the transistor. The planarization insulating film can be formed using a heat-resistant organic material such as polyimide, acrylic, benzocyclobutene, polyamide, or epoxy. Other than such organic materials, it is possible to use a low-dielectric constant material (a low-k material), a siloxane-based resin, PSG (phosphosilicate glass), BPSG (borophosphosilicate glass), or the like. Note that the planarization insulating film may be formed by stacking a plurality of insulating films formed from these materials.

By using the transistor including the oxide semiconductor layer in this embodiment, it is possible to provide a highly functional liquid crystal display device with lower power consumption.

This embodiment can be implemented in appropriate combination with any of the components described in the other embodiments.

Embodiment 4

When thin film transistors are manufactured and used for a pixel portion and a driver circuit, a liquid crystal display device having a display function can be manufactured. Further, part of or the entire driver circuit can be formed over a substrate where a pixel portion is formed, using a thin film transistor; thus, a system-on-panel can be obtained.

Note that the liquid crystal display device includes any of the following modules in its category: a module provided with a connector, for example, a flexible printed circuit (FPC), a tape automated bonding (TAB) tape, or a tape carrier package (TCP); a module provided with a printed wiring board at the end of a TAB tape or a TCP; and a module where an integrated circuit (IC) is directly mounted on a display element by a chip-on-glass (COG) method.

The appearance and a cross section of a liquid crystal display device will be described with reference to FIGS. 10A1, 10A2, and 10B. FIGS. 10A1 and 10A2 are plan views of panels in which thin film transistors 4010 and 4011 and a liquid crystal element 4013 are sealed between a first substrate 4001 and a second substrate 4006 with a sealant 4005. FIG. 10B is a cross-sectional view along M-N in FIGS. 10A1 and 10A2.

The sealant 4005 is provided so as to surround a pixel portion 4002 and a gate line driver circuit 4004 that are provided over the first substrate 4001. The second substrate 4006 is provided over the pixel portion 4002 and the gate line driver circuit 4004. Therefore, the pixel portion 4002 and the gate line driver circuit 4004 are sealed together with a liquid crystal layer 4008, by the first substrate 4001, the sealant 4005, and the second substrate 4006. A signal line driver circuit 4003 that is formed using a single crystal semiconductor film or a polycrystalline semiconductor film over a substrate separately prepared is mounted in a region that is different from the region surrounded by the sealant 4005 over the first substrate 4001.

Note that there is no particular limitation on the connection method of a driver circuit that is separately formed, and a COG method, a wire bonding method, a TAB method, or the like can be used. FIG. 10A1 illustrates an example where the signal line driver circuit 4003 is mounted by a COG method. FIG. 10A2 illustrates an example where the signal line driver circuit 4003 is mounted by a TAB method.

The pixel portion 4002 and the gate line driver circuit 4004 provided over the first substrate 4001 include a plurality of thin film transistors. FIG. 10B illustrates the thin film transistor 4010 included in the pixel portion 4002 and the thin film transistor 4011 included in the gate line driver circuit 4004. Insulating layers 4041a, 4041b, 4042a, 4042b, 4020, and 4021 are provided over the thin film transistors 4010 and 4011.

A highly reliable thin film transistor including an oxide semiconductor layer can be used as the thin film transistors 4010 and 4011. In this embodiment, the thin film transistors 4010 and 4011 are n-channel thin film transistors.

A conductive layer 4040 is provided over part of the insulating layer 4021, which overlaps with a channel formation region of an oxide semiconductor layer in the thin film transistor 4011 for the driver circuit. The conductive layer 4040 is provided at the position overlapping with the channel formation region of the oxide semiconductor layer, so that the amount of change in threshold voltage of the thin film transistor 4011 before and after the BT (bias-temperature) test can be reduced. The potential of the conductive layer 4040 may be the same or different from that of a gate electrode layer of the thin film transistor 4011. The conductive layer 4040 can also function as a second gate electrode layer. The potential of the conductive layer 4040 may be GND or 0 V, or the conductive layer 4040 may be in a floating state.

A pixel electrode layer 4030 included in the liquid crystal element 4013 is electrically connected to the thin film transistor 4010. A counter electrode layer 4031 of the liquid crystal element 4013 is provided for the second substrate 4006. A portion where the pixel electrode layer 4030, the counter electrode layer 4031, and the liquid crystal layer 4008 overlap with one another corresponds to the liquid crystal element 4013. Note that the pixel electrode layer 4030 and the counter electrode layer 4031 are provided with an insulating layer 4032 and an insulating layer 4033 functioning as alignment films, respectively, and the liquid crystal layer 4008 is sandwiched between the pixel electrode layer 4030 and the counter electrode layer 4031 with the insulating layers 4032 and 4033 therebetween.

Note that a light-transmitting substrate can be used as the first substrate 4001 and the second substrate 4006; glass, ceramics, or plastics can be used. As plastics, a fiberglass-reinforced plastics (FRP) plate, a polyvinyl fluoride (PVF) film, a polyester film, or an acrylic resin film can be used.

A spacer 4035 is a columnar spacer obtained by selective etching of an insulating film and is provided in order to control the distance (a cell gap) between the pixel electrode layer 4030 and the counter electrode layer 4031. Note that a spherical spacer may be used. The counter electrode layer 4031 is electrically connected to a common potential line formed over the substrate where the thin film transistor 4010 is formed. With use of the common connection portion, the counter electrode layer 4031 and the common potential line can be electrically connected to each other by conductive particles arranged between a pair of substrates. Note that the conductive particles can be included in the sealant 4005.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase is only generated within a narrow range of temperature, a liquid crystal composition containing a chiral agent at 5 wt % or more so as to improve the temperature range is used for the liquid crystal layer 4008. The liquid crystal composition that includes a liquid crystal exhibiting a blue phase and a chiral agent has a short response time of 1 msec or less, has optical isotropy, which makes the alignment process unneeded, and has a small viewing angle dependence.

Note that this embodiment can also be applied to a transflective liquid crystal display device in addition to a transmissive liquid crystal display device.

This embodiment shows the example of the liquid crystal display device in which a polarizing plate is provided on the outer side of the substrate (on the viewer side) and a coloring layer and an electrode layer used for a display element are provided in this order on the inner side of the substrate; alternatively, a polarizing plate may be provided on the inner side of the substrate. The layered structure of the polarizing plate and the coloring layer is not limited to that in this embodiment and may be set as appropriate depending on materials of the polarizing plate and the coloring layer or conditions of the manufacturing process. Further, a light-blocking film serving as a black matrix may be provided in a portion other than a display portion.

The insulating layer 4041a that serves as a channel protective layer and the insulating layer 4041b that covers an outer edge portion (including a side surface) of the stack of the oxide semiconductor layers are formed in the thin film transistor 4011. In a similar manner, the insulating layer 4042a that serves as a channel protective layer and the insulating layer 4042b that covers an outer edge portion (including a side surface) of the stack of the oxide semiconductor layers are formed in the thin film transistor 4010.

The insulating layers 4041b and 4042b that are oxide insulating layers covering the outer edge portion (including the side surface) of the stack of the oxide semiconductor layers can increase the distance between the gate electrode layer and a wiring layer (e.g., a source wiring layer or a capacitor wiring layer) formed over or around the gate electrode layer, so that the parasitic capacitance can be reduced. In order to reduce the surface roughness of the thin film transistors, the thin film transistors are covered with the insulating layer 4021 serving as a planarizing insulating film. Here, as the insulating layers 4041a, 4041b, 4042a, and 4042b, a silicon oxide film is formed by a sputtering method, for example.

Moreover, the insulating layer 4020 is formed over the insulating layers 4041a, 4041b, 4042a, and 4042b. As the insulating layer 4020, a silicon nitride film is formed by an RF sputtering method, for example.

The insulating layer 4021 is formed as the planarizing insulating film. As the insulating layer 4021, an organic material having heat resistance, such as polyimide, acrylic, benzocyclobutene, polyamide, or epoxy can be used. Other than such organic materials, it is also possible to use a low-dielectric constant material (a low-k material), a siloxane-based resin, PSG (phosphosilicate glass), BPSG (borophosphosilicate glass), or the like. Note that the insulating layer 4021 may be formed by stacking a plurality of insulating films formed of these materials.

In this embodiment, a plurality of thin film transistors in the pixel portion may be surrounded together by a nitride insulating film. It is possible to use a nitride insulating film as the insulating layer 4020 and the gate insulating layer and to provide a region where the insulating layer 4020 is in contact with the gate insulating layer so as to surround at least the periphery of the pixel portion in the active matrix substrate. In this manufacturing process, entry of moisture from the outside can be prevented. Further, even after the device is completed as a liquid crystal display device, entry of moisture from the outside can be prevented in the long term, and the long-term reliability of the device can be improved.

Note that a siloxane-based resin corresponds to a resin including a Si—O—Si bond formed using a siloxane-based material as a starting material. The siloxane-based resin may include an organic group (e.g., an alkyl group or an aryl group) or a fluoro group as a substituent. The organic group may include a fluoro group.

There is no particular limitation on the formation method of the insulating layer 4021, and any of the following methods and tools can be employed, for example, depending on the material: a sputtering method, an SOG method, a spin coating method, a dipping method, a spray coating method, a droplet discharge method (e.g., an ink-jet method, screen printing, and offset printing), a doctor knife, a roll coater, a curtain coater, and a knife coater. The baking step of the insulating layer 4021 also serves as annealing of the semiconductor layer, so that a liquid crystal display device can be efficiently manufactured.

The pixel electrode layer 4030 and the counter electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (referred to as ITO), indium zinc oxide, or indium tin oxide to which silicon oxide is added.

Alternatively, the pixel electrode layer 4030 and the counter electrode layer 4031 can be formed using a conductive composition including a conductive high molecule (also referred to as a conductive polymer). The pixel electrode formed using the conductive composition preferably has a sheet resistance of less than or equal to 10000 ohms per square and a transmittance of greater than or equal to 70% at a wavelength of 550 nm. Further, the resistivity of the conductive high molecule included in the conductive composition is preferably less than or equal to 0.1 Ω·cm.

As the conductive high molecule, a so-called π-electron conjugated conductive high molecule can be used. Examples are polyaniline or a derivative thereof, polypyrrole or a derivative thereof, polythiophene or a derivative thereof, and a copolymer of two or more of these materials.

A variety of signals and potentials are supplied from an FPC 4018 to the signal line driver circuit 4003 which is formed separately, the gate line driver circuit 4004, or the pixel portion 4002.

A connection terminal electrode 4015 is formed from the same conductive film as the pixel electrode layer 4030 included in the liquid crystal element 4013, and a terminal electrode 4016 is formed from the same conductive film as source and drain electrode layers of the thin film transistors 4010 and 4011.

The connection terminal electrode 4015 is electrically connected to a terminal included in the FPC 4018 via an anisotropic conductive film 4019.

Note that FIGS. 10A1 and 10A2 illustrate the example in which the signal line driver circuit 4003 is formed separately and mounted on the first substrate 4001; however, the this embodiment is not limited to this structure. The gate line driver circuit may be separately formed and then mounted, or only part of the signal line driver circuit or part of the gate line driver circuit may be separately formed and then mounted.

Figure 11:
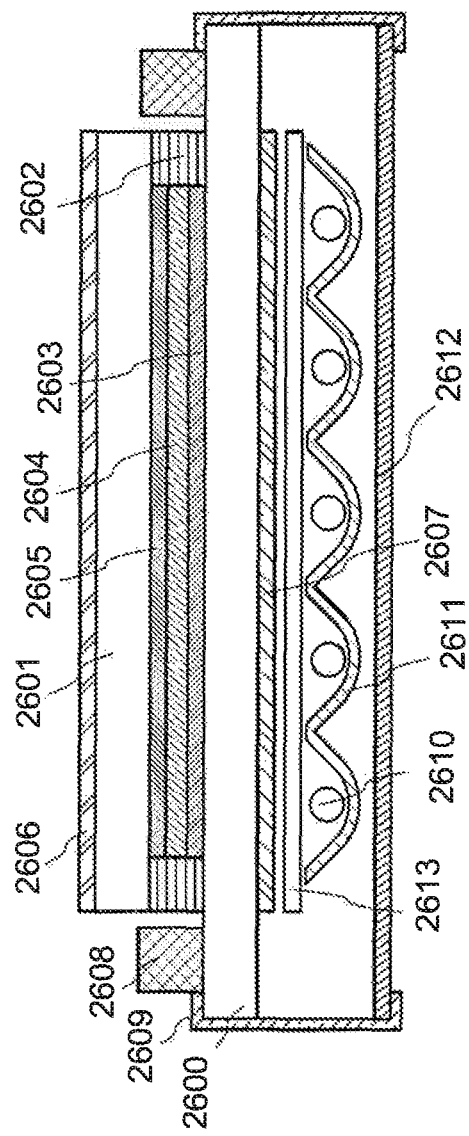
FIG. 11 illustrates a diagram for explaining a liquid crystal display device of one embodiment of the present invention.

FIG. 11 illustrates an example of a structure of a liquid crystal display device.

FIG. 11 illustrates an example of a liquid crystal display device. A TFT substrate 2600 and a counter substrate 2601 are fixed to each other with a sealant 2602. A pixel portion 2603 including a TFT and the like, a display element 2604 including a liquid crystal layer, and a coloring layer 2605 are provided between the substrates so that a display region is formed. The coloring layer 2605 is necessary to perform color display. In the RGB system, coloring layers corresponding to colors of red, green, and blue are provided for pixels. A polarizing plate 2606 is provided on the outer side of the counter substrate 2601. A polarizing plate 2607 and a diffusion plate 2613 are provided on the outer side of the TFT substrate 2600. A light source includes a cold cathode tube 2610 and a reflective plate 2611. A circuit board 2612 is connected to a wiring circuit portion 2608 of the TFT substrate 2600 by a flexible wiring board 2609 and includes an external circuit such as a control circuit or a power source circuit. The polarizing plate and the liquid crystal layer may be stacked with a retardation plate therebetween.

For a method for driving the liquid crystal display device, a TN (twisted nematic) mode, an IPS (in-plane-switching) mode, an FFS (fringe field switching) mode, an MVA (multi-domain vertical alignment) mode, a PVA (patterned vertical alignment) mode, an ASM (axially symmetric aligned micro-cell) mode, an OCB (optically compensated birefringence) mode, an FLC (ferroelectric liquid crystal) mode, an AFLC (antiferroelectric liquid crystal) mode, or the like can be used.

Through the above-described process, it is possible to manufacture a liquid crystal display device in which deterioration of a displayed image can be reduced in displaying a still image.

This embodiment can be implemented in appropriate combination with any of the components described in the other embodiments.

Embodiment 5

In this embodiment, an example of an electronic device including the liquid crystal display device described in any of the above-described embodiments will be described.

Figure 12A:
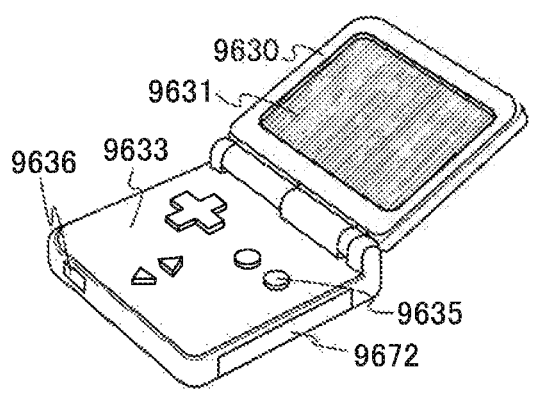
FIGS. 12A to 12D each illustrate a diagram for explaining an electronic device of one embodiment of the present invention.

FIG. 12A illustrates a portable game machine that can include a housing 9630, a display portion 9631, a speaker 9633, operation keys 9635, a connection terminal 9636, a recording medium reading portion 9672, and the like. The portable game machine in FIG. 12A can have a function of reading a program or data stored in the recording medium to display it on the display portion, a function of sharing information with another portable game machine by wireless communication, and the like. Note that the functions of the portable game machine in FIG. 12A are not limited to those described above, and the portable game machine can have various functions.

Figure 12B:
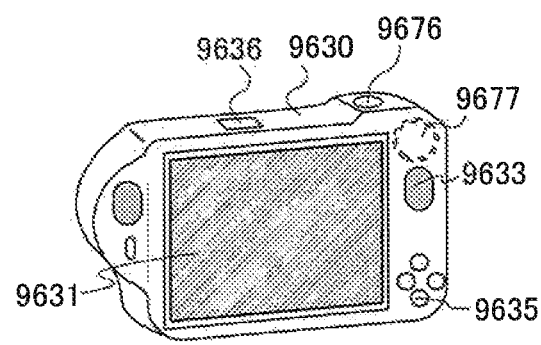

FIG. 12B illustrates a digital camera that can include a housing 9630, a display portion 9631, a speaker 9633, operation keys 9635, a connection terminal 9636, a shutter button 9676, an image receiving portion 9677, and the like.

The digital camera in FIG. 12B can have a function of photographing a still image and/or a moving image, a function of automatically or manually correcting the photographed image, a function of obtaining various kinds of information from an antenna, a function of saving the photographed image or the information obtained from the antenna, a function of displaying the photographed image or the information obtained from the antenna on the display portion, and the like. Note that the digital camera in FIG. 12B can have a variety of functions without being limited to the above.

Figure 12C:
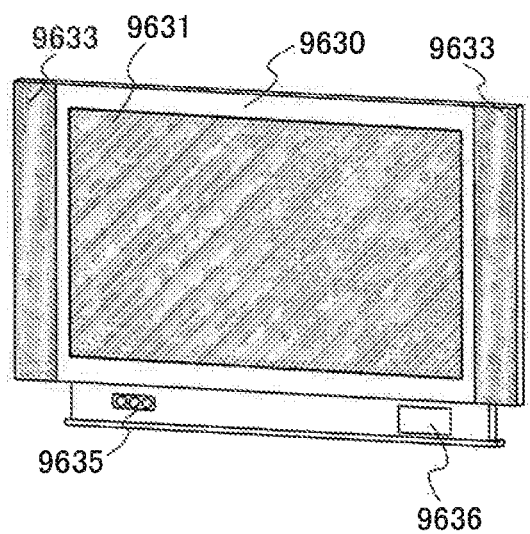

FIG. 12C illustrates a television set that can include a housing 9630, a display portion 9631, speakers 9633, operation key 9635, a connection terminal 9636, and the like. The television set in FIG. 12C has a function of converting an electric wave for television into an image signal, a function of converting an image signal into a signal suitable for display, a function of converting the frame frequency of an image signal, and the like. Note that the television set in FIG. 12C can have a variety of functions without being limited to the above.

Figure 12D:
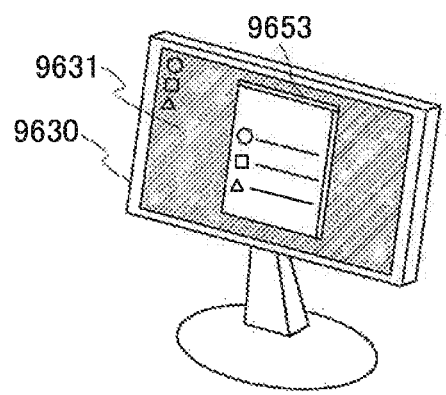

FIG. 12D illustrates a monitor for electronic computers (personal computers) (the monitor is also referred to as a PC monitor) that can include a housing 9630, a display portion 9631, and the like. As an example, in the monitor in FIG. 12D, a window 9653 is displayed on the display portion 9631. Note that FIG. 12D illustrates the window 9653 displayed on the display portion 9631 for explanation; a symbol such as an icon or an image may be displayed. Since still images are often displayed on the monitor for personal computers, the method for driving a liquid crystal display device in the above-described embodiment is preferably applied. Note that the monitor in FIG. 12D can have various functions without being limited to the above.

Figure 13A:
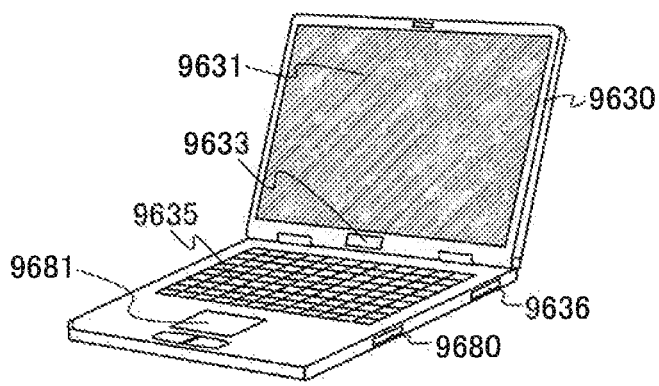
FIGS. 13A to 13D each illustrate a diagram for explaining an electronic device of one embodiment of the present invention.

FIG. 13A illustrates a computer that can include a housing 9630, a display portion 9631, a speaker 9633, operation keys 9635, a connection terminal 9636, a pointing device 9681, an external connection port 9680, and the like. The computer in FIG. 13A can have a function of displaying a variety of information (e.g., a still image, a moving image, and a text image) on the display portion, a function of controlling processing by a variety of software (programs), a communication function such as wireless communication or wired communication, a function of being connected to various computer networks with the communication function, a function of transmitting or receiving a variety of data with the communication function, and the like. Note that the computer in FIG. 13A is not limited to having these functions and can have a variety of functions.

Figure 13B:
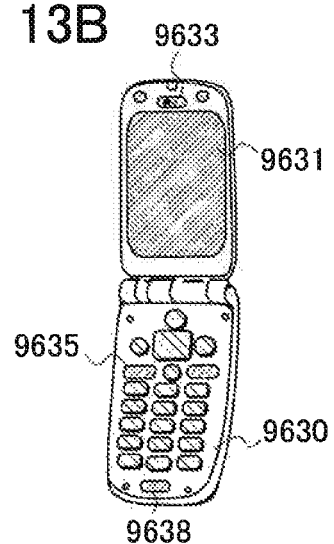

FIG. 13B illustrates a mobile phone that can include a housing 9630, a display portion 9631, a speaker 9633, operation keys 9635, a microphone 9638, and the like. The mobile phone in FIG. 13B can have a function of displaying a variety of information (e.g., a still image, a moving image, and a text image) on the display portion; a function of displaying a calendar, a date, the time, or the like on the display portion; a function of operating or editing the information displayed on the display portion; a function of controlling processing by various kinds of software (programs); and the like. Note that the functions of the mobile phone in FIG. 13B are not limited to those described above, and the mobile phone can have various functions.

Figure 13C:
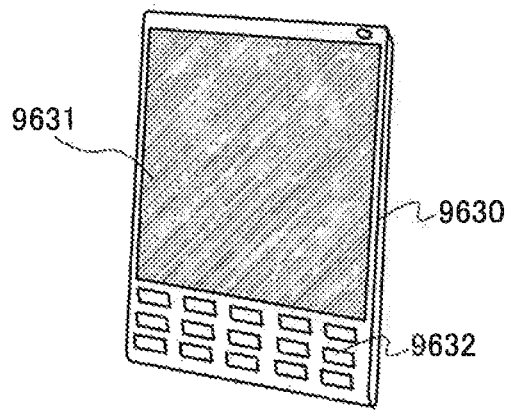
Figure 13D:
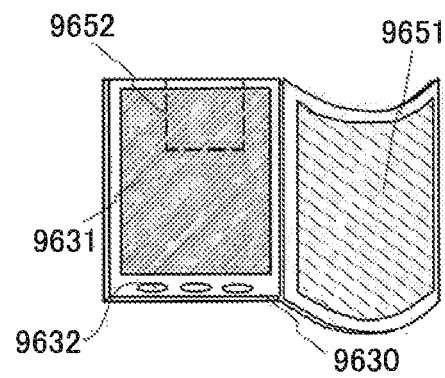

FIG. 13C illustrates an electronic device including electronic paper (also referred to as an eBook or an e-book reader) that can include a housing 9630, a display portion 9631, operation keys 9632, and the like. The e-book reader in FIG. 13C can have a function of displaying a variety of information (e.g., a still image, a moving image, and a text image) on the display portion; a function of displaying a calendar, a date, the time, and the like on the display portion; a function of operating or editing the information displayed on the display portion; a function of controlling processing by various kinds of software (programs); and the like. Note that the e-book reader in FIG. 13C can have a variety of functions without being limited to the above functions. FIG. 13D illustrates another structure of an e-book reader. The e-book reader in FIG. 13D has a structure obtained by adding a solar battery 9651 and a battery 9652 to the e-book reader in FIG. 13C. When a reflective liquid crystal display device is used as the display portion 9631, the e-book reader is expected to be used in a comparatively bright environment, in which case the structure in FIG. 13D is preferable because the solar battery 9651 can efficiently generate power and the battery 9652 can efficiently charge power. Note that when a lithium ion battery is used as the battery 9652, an advantage such as reduction in size can be obtained.

In the electronic device described in this embodiment, deterioration of a displayed image can be reduced when a still image is displayed.

This embodiment can be implemented in appropriate combination with any of the components described in the other embodiments.

This application is based on Japanese Patent Application serial No. 2009-295608 filed with Japan Patent Office on Dec. 25, 2009, the entire contents of which are hereby incorporated by reference.

EXPLANATION OF REFERENCE

100: display panel, 101: pixel portion, 102: gate line, 102D: gate line driver circuit, 103: signal line, 103D: signal line driver circuit, 104: pixel, 105: common electrode, 106: capacitor line, 106A: first capacitor line, 106B: second capacitor line, 107: terminal portion, 108: pixel transistor, 109: liquid crystal element, 110: capacitor, 111: pixel electrode, 112: counter electrode, 113: liquid crystal, 121: arrow, 122: arrow, 123: arrow, 301: display panel portion, 302: peripheral circuit portion, 303: image switching circuit, 304: display control circuit, 305: holding signal generation circuit, 400: substrate, 401: gate electrode layer, 402: gate insulating layer, 403: oxide semiconductor layer, 405a: source electrode layer, 405b: drain electrode layer, 407: insulating layer, 409: protective insulating layer, 410: transistor, 420: transistor, 427: insulating layer, 430: transistor, 440: transistor, 446a: wiring layer, 446b: wiring layer, 447: insulating layer, 501: first current source circuit, 502: first switch, 503: second switch, 504: second current source circuit, 505: third switch, 506: terminal, 507: switching terminal, 1400: display panel, 1401: pixel portion, 1402: gate line, 1403: signal line, 1404: pixel, 1405: common electrode, 1406: capacitor line, 1407: terminal portion, 1408: pixel transistor, 1409: liquid crystal element, 1410: capacitor, 1411: pixel electrode, 1412: counter electrode, 1413: liquid crystal, 1501: arrow, 1502: arrow, 1503: arrow, 2600: TFT substrate, 2601: counter substrate, 2602: sealant, 2603: pixel portion, 2604: display element, 2605: coloring layer, 2606: polarizing plate, 2607: polarizing plate, 2608: wiring circuit portion, 2609: flexible wiring board, 2610: cold cathode tube, 2611: reflective plate, 2612: circuit board, 2613: diffusion plate, 4001: first substrate, 4002: pixel portion, 4003: signal line driver circuit, 4004: gate line driver circuit, 4005: sealant, 4006: second substrate, 4008: liquid crystal layer, 4010: thin film transistor, 4011: thin film transistor, 4013: liquid crystal element, 4015: connection terminal electrode, 4016: terminal electrode, 4018: FPC, 4019: anisotropic conductive film, 4020: insulating layer, 4021: insulating layer, 4030: pixel electrode layer, 4031: counter electrode layer, 4032: insulating layer, 4033: insulating layer, 4035: spacer, 4040: conductive layer, 4041*a*: insulating layer, 4041*b*: insulating layer, 4042*a*: insulating layer, 4042*b*: insulating layer, 9630: housing, 9631: display portion, 9632: operation key, 9633: speaker, 9635: operation key, 9636: connection terminal, 9638: microphone, 9651: solar battery, 9652: battery, 9653: window, 9672: recording medium reading portion, 9676: shutter button, 9677: image receiving portion, 9680: external connection port, 9681: pointing device

The invention claimed is:

1. A display device comprising:
    a first pixel comprising:
        a first transistor;
        a first liquid crystal element; and
        a first capacitor;
    a second pixel comprising:
        a second transistor;
        a second liquid crystal element; and
        a second capacitor; and
    a holding signal generation circuit,
    wherein each of the first transistor and the second transistor comprises an oxide semiconductor layer comprising a channel formation region,
    wherein one of a source and a drain of the first transistor is electrically connected to a pixel electrode of the first liquid crystal element,
    wherein a first electrode of the first capacitor is electrically connected to the pixel electrode of the first liquid crystal element,
    wherein a second electrode of the first capacitor is electrically connected to a capacitor line,
    wherein one of a source and a drain of the second transistor is electrically connected to a pixel electrode of the second liquid crystal element,
    wherein a first electrode of the second capacitor is electrically connected to the pixel electrode of the second liquid crystal element,
    wherein a second electrode of the second capacitor is electrically connected to the capacitor line,
    wherein the holding signal generation circuit is configured to supply a constant voltage to the capacitor line during a moving image display, and
    wherein the holding signal generation circuit is configured to supply a holding signal to the capacitor line during a still image display such that a change of a voltage applied to the first liquid crystal element and a change of a voltage applied to the second liquid crystal element are reduced.

2. The display device according to claim 1,
    wherein a gate of the first transistor is electrically connected to a gate line, and
    wherein a gate of the second transistor is electrically connected to the gate line.

3. The display device according to claim 1,
    wherein the other of the source and the drain of the first transistor is electrically connected to a signal line, and
    wherein the other of the source and the drain of the second transistor is electrically connected to the signal line.

4. The display device according to claim 1,
    wherein a gate of the first transistor is electrically connected to a first gate line,
    wherein a gate of the second transistor is electrically connected to a second gate line,
    wherein the other of the source and the drain of the first transistor is electrically connected to a first signal line, and
    wherein the other of the source and the drain of the second transistor is electrically connected to a second signal line.

5. The display device according to claim 1,
    wherein an off-state current of the first transistor is equal to or lower than $1\times10^{-17}$ A/μm.

6. The display device according to claim 1,
    wherein the holding signal generation circuit comprises a current source circuit, and
    wherein the current source circuit is electrically connected to the second electrode of the first capacitor through the capacitor line.

7. A display device comprising:
    a first pixel comprising:
        a first transistor;
        a first liquid crystal element; and
        a first capacitor;
    a second pixel comprising:
        a second transistor;
        a second liquid crystal element; and
        a second capacitor; and
    a holding signal generation circuit,
    wherein each of the first transistor and the second transistor comprises an oxide semiconductor layer comprising a channel formation region,
    wherein one of a source and a drain of the first transistor is electrically connected to a pixel electrode of the first liquid crystal element,
    wherein a first electrode of the first capacitor is electrically connected to the pixel electrode of the first liquid crystal element,
    wherein a second electrode of the first capacitor is electrically connected to a capacitor line,
    wherein one of a source and a drain of the second transistor is electrically connected to a pixel electrode of the second liquid crystal element,
    wherein a first electrode of the second capacitor is electrically connected to the pixel electrode of the second liquid crystal element,
    wherein a second electrode of the second capacitor is electrically connected to the capacitor line,
    wherein the holding signal generation circuit is configured to supply a constant voltage to the capacitor line during a first frame period,
    wherein the holding signal generation circuit is configured to supply a holding signal to the capacitor line during a second frame period such that a change of a voltage applied to the first liquid crystal element and a change of a voltage applied to the second liquid crystal element are reduced, and
    wherein the second frame period is longer than the first frame period.

8. The display device according to claim 7,
    wherein a gate of the first transistor is electrically connected to a gate line, and
    wherein a gate of the second transistor is electrically connected to the gate line.

9. The display device according to claim 7,
    wherein the other of the source and the drain of the first transistor is electrically connected to a signal line, and
    wherein the other of the source and the drain of the second transistor is electrically connected to the signal line.

10. The display device according to claim 7,
wherein a gate of the first transistor is electrically connected to a first gate line,
wherein a gate of the second transistor is electrically connected to a second gate line,
wherein the other of the source and the drain of the first transistor is electrically connected to a first signal line, and
wherein the other of the source and the drain of the second transistor is electrically connected to a second signal line.

11. The display device according to claim 7,
wherein an off-state current of the first transistor is equal to or lower than $1 \times 10^{-17}$ A/μm.

12. The display device according to claim 7,
wherein the holding signal generation circuit comprises a current source circuit, and
wherein the current source circuit is electrically connected to the second electrode of the first capacitor through the capacitor line.

* * * * *